(12) United States Patent
Ishii et al.

(10) Patent No.: US 10,072,730 B2
(45) Date of Patent: Sep. 11, 2018

(54) CORD LOCK

(71) Applicant: NIFCO INC., Yokosuka-shi, Kanagawa (JP)

(72) Inventors: Taiyo Ishii, Yokosuka (JP); Yohei Shimizu, Yokosuka (JP)

(73) Assignee: NIFCO INC., Yokosuka-shi, Kanagawa (JP)

( * ) Notice: Subject to any disclaimer, the term of this patent is extended or adjusted under 35 U.S.C. 154(b) by 0 days.

(21) Appl. No.: 15/542,547

(22) PCT Filed: Jan. 15, 2016

(86) PCT No.: PCT/JP2016/051079
§ 371 (c)(1),
(2) Date: Jul. 10, 2017

(87) PCT Pub. No.: WO2016/117456
PCT Pub. Date: Jul. 28, 2016

(65) Prior Publication Data
US 2018/0003264 A1 Jan. 4, 2018

(30) Foreign Application Priority Data

Jan. 20, 2015 (JP) .................................. 2015-008339
Dec. 7, 2015 (JP) .................................. 2015-238159

(51) Int. Cl.
*F16G 11/00* (2006.01)
*F16G 11/10* (2006.01)

(52) U.S. Cl.
CPC .................................. *F16G 11/101* (2013.01)

(58) Field of Classification Search
CPC ...................................................... F16G 11/101
See application file for complete search history.

(56) References Cited

U.S. PATENT DOCUMENTS 3,094,755 A * 6/1963 Casanave ............... F16G 11/046
114/230.2
D247,345 S * 2/1978 Mulholland ................... D2/607
(Continued)

FOREIGN PATENT DOCUMENTS

FR 2661804 A1 11/1991
JP 2007-061321 A 3/2007
(Continued)

OTHER PUBLICATIONS

PCT/ISA/210, "International Search Report for International Application No. PCT/JP2016/051079," dated Mar. 22, 2016.

*Primary Examiner* — David M Upchurch
(74) *Attorney, Agent, or Firm* — Manabu Kanesaka

(57) ABSTRACT

A cord lock includes a first member having a first passage and a second passage for a cord; a second member combined with the first member to be capable of moving to rise and fall as a support point on the second passage side, and including a third passage positioned between the first passage and the second passage on a free end side of the rising and falling movement, and passing the cord; and an urging device urging the second member in a standing direction. The support point is formed by an engaging portion formed in one of the first member and the second member, and an engaged portion formed in the other, and engaged with the engaging portion, and the cord pulled out of the second passage is positioned on a free end side of the second member more than the support point.

7 Claims, 18 Drawing Sheets

(56) References Cited

U.S. PATENT DOCUMENTS

| | | | |
|---|---|---|---|
| D550,067 S * | 9/2007 | Hsiao | D8/356 |
| 2004/0148742 A1 | 8/2004 | Salomon | |
| 2007/0044278 A1 | 3/2007 | Kinebushi et al. | |
| 2008/0098574 A1 | 5/2008 | Kim | |
| 2011/0067211 A1 * | 3/2011 | Huber | A43B 5/0401 24/712.1 |
| 2012/0005865 A1 * | 1/2012 | Boden | F16G 11/101 24/136 R |
| 2012/0042498 A1 * | 2/2012 | Chu | F16G 11/101 29/453 |
| 2013/0104346 A1 * | 5/2013 | Kawaguchi | F16G 11/101 24/115 G |
| 2015/0366299 A1 * | 12/2015 | Huang | A44B 11/12 24/163 R |

FOREIGN PATENT DOCUMENTS

| | | |
|---|---|---|
| JP | 2008-505725 A | 2/2008 |
| JP | 2013-000270 A | 1/2013 |
| JP | 5336222 B2 | 11/2013 |

* cited by examiner

CORD LOCK

FIELD OF TECHNOLOGY

The present invention relates to an improvement of a cord lock formed so as to be fastened to an arbitrary position of a cord, and to release this fastening state by a push-in operation against urging.

BACKGROUND ART

There is shown a cord lock comprising a main member including a bottom face portion and side face portions; a pressing member housing a pivotal support portion (shaft) in a pivotal support hole (shaft hole) provided in the side face portions of the main member, and assembled so as to be capable of moving to rise and fall relative to the main member around the pivotal support portion; and an urging device urging the pressing member in a standing direction, shown in Patent Document 1.

In such cord lock of the Patent Document 1, based on the relationship that the main member and the pressing member are combined by housing the pivotal support portion provided on side portions of the pressing member in the pivotal support hole provided in the side face portions of the main member, a certain thickness is necessary for such side face portions and side portions.

Also, in such cord lock of the Patent Document 1, the cord has to have a structure wherein the cord is passed into the pressing member forming a cylinder shape through a through hole provided in side portions in a width direction positioned on a free end side of the pressing member in the main member, and is pulled out of a side facing the through hole at a back of the pivotal support portion.

PRIOR ART DOCUMENT

Patent Document

Patent Document 1: Japanese Patent No. 5336222

SUMMARY OF THE INVENTION

Problems to be Solved by the Invention

A main object of the present invention is to allow two members forming this type of cord lock to be combined in a condition with the least possible influences to a thickness and the like of a cord lock while securing the easiness of an operation and a degree of freedom in a shape.

Means for Solving the Problems

In order to obtain the aforementioned object, in a first aspect of the present invention, a cord lock comprises a first member including a first passage portion and a second passage portion for a cord; a second member combined with the first member so as to be capable of moving to rise and fall as a support point on a second passage portion side, and including a third passage portion positioned between the first passage portion and the second passage portion on a free end side of the aforementioned rising and falling movement, and passing the cord through; and an urging device urging the second member in a standing direction. Also, the support point is formed by an engaging portion formed in one of the first member and the second member; and an engaged portion formed in the other of those, and engaged with the engaging portion, and the cord pulled out of the second passage portion is positioned on the free end side of the second member more than the support point.

Also, in order to obtain the aforementioned object, in a second aspect of the present invention, the cord lock comprises a first member including a first passage portion and a second passage portion for the cord; a second member combined with the first member so as to be capable of moving to rise and fall as a support point on a second passage portion side, and including a third passage portion positioned between the first passage portion and the second passage portion on a free end side of the aforementioned rising and falling movement, and passing the cord through; and an urging device urging the second member in the standing direction. Also, the first member includes side face portions and a bottom face portion, and supports the second member so as to be capable of moving to rise and fall inside the side face portions and the bottom face portion, and the second passage portion is formed across the side face portions and the bottom face portion.

Also, in order to obtain the aforementioned object, in a third aspect of the present invention, the cord lock comprises a first member including a first passage portion and a second passage portion for the cord; s second member combined with the first member so as to be capable of moving to rise and fall as a support point on a second passage portion side, and including a third passage portion positioned between the first passage portion and the second passage portion on a free end side of the aforementioned rising and falling movement, and passing the cord through; and an urging device urging the second member in the standing direction. Also, the support point is formed by an engaging portion formed in one of the first member and the second member; and an engaged portion formed in the other of those, and engaged with the engaging portion. Also, the first member includes side face portions and a bottom face portion, and supports the second member so as to be capable of moving to rise and fall inside the side face portions and the bottom face portion, and one of the engaging portion and the engaged portion is provided on a bottom face portion side of the first member.

The cord can pass through the cord lock in such a way as to be inserted from the first passage portion, and pulled out of the second passage portion through the third passage portion in a state wherein the first passage portion and the third passage portion are matched so as to pass the cord through by pushing the second member against urging of the urging device. Alternatively, the cord can pass through the cord lock in such a way as to be inserted from the second passage portion, and pulled out of the first passage portion through the third passage portion in the state wherein the first passage portion and the third passage portion are matched so as to pass the cord through by pushing the second member against the urging of the urging device. Thus, after the cord passes through the cord lock, when the pushing of the second member is stopped, the second member turns in the standing direction by the urging of the urging device so as to form a state wherein the first passage portion and the third passage portion do not match, thereby the cord lock is fastened to the cord.

In a case wherein the support point is formed by a shaft and a shaft hole, typically, in order to provide the shaft hole, a certain thickness becomes necessary for the side face portions of the first member. Also, in a case wherein the support point has a structure wherein the cord passes through, a thickness on the support point side of the cord lock cannot have a thickness of the cord or less. On the other hand, in the cord lock according to the first aspect, such support point is formed by the engaging portion and the engaged portion, and the cord pulled out of the second passage portion is positioned on the free end side of the second member more than the support point, so that the support point can be formed in such a way not to influence to the thickness and the like of the cord lock.

In the cord lock according to the second aspect, especially, the second passage portion is formed across the side face portions and the bottom face portion, so that without increasing the thickness of the first member, an area of the second passage portion can be maximized, and the cord lock can be fastened to the cord in such a way that the cord is pulled out in a direction further free from the second passage portion.

Also, if the bottom face portion of the first member is bent or curved in such a way that the support point side becomes an inside of bending or curving, in a case wherein the cord pulled out of the second passage portion functions in such a way as to narrow one portion of an article, a gap is formed between the bottom face portion of the first member positioned on the free end side of the second member and an outer face of the article, and the cord lock can be provided in such a way that the bottom face portion of the first member on the support point side is tightly attached to the outer face of the article, so that a push-in operation of the second member which releases the fastening of the cord becomes easy.

Also, if a guide wall guiding the cord inserted from one of the first passage portion and the second passage portion to the other of those, is provided, in a case wherein although the cord passing through in the cord lock as mentioned above is straight between the first passage portion and the second passage portion, the cord bends or curves at the second passage portion to be pulled out to a side; and the cord inserted from the second passage portion side can be reliably guided to the first passage portion.

In that case, in one preferred aspect, the guide wall is formed by a first guide wall formed inside the first member; and a second guide wall formed inside the second member, and forming one portion of an insertion passage for the cord together with the first guide wall in a state wherein the second member is fallen against the urging of the urging device.

Also, in one preferred aspect, on the bottom face portion of the first member, there comprises a concave portion housing the free end side of the second member so as not to form a step between the third passage portion and the bottom face portion in a state wherein the second member is operated to be pushed in against the urging of the urging device. In such a case, especially, the cord inserted from the second passage portion side can be smoothly guided to the first passage portion.

Also, in one preferred aspect, the urging device is formed by an elastically deformable portion which is one portion of the second member, and provided between the third passage portion and the support point. Also, the first member comprises a support portion abutting against the elastically deformable portion and causing the elastic deformation in the elastically deformable portion.

Also, in one preferred aspect, the urging device is formed by the elastically deformable portion which is one portion of the second member, and provided between the third passage portion and the support point. Also, the second member comprises a support portion abutting against the first member, and causing the elastic deformation in the elastically deformable portion.

Also, in one preferred aspect, the urging device is formed by the elastically deformable portion which is one portion of the second member, extends to the support point side from the third passage portion side, forms the insertion passage for the cord between the elastically deformable portion and the base plate portion of the second member, and abuts against the first member.

Effect of the Invention

According to the present invention, in an aspect wherein two members forming this type of cord lock have the least possible influences to the thickness and the like of the cord lock, the two members can be combined while securing the easiness of an operation and a degree of freedom in a shape. As a result, in the present invention, the cord lock can be easily designed so as to have the most suitable shape for a use object of the cord lock.

BRIEF DESCRIPTION OF THE DRAWINGS

FIG. 7 is a cross-sectional view at an A-A line position in FIG. 5, and shows a state wherein a second member is not pushed in.

FIG. 8 is a cross-sectional view at the A-A line position in FIG. 5, and shows a state wherein the second member is pushed in.

FIG. 9 is a cross-sectional view at a B-B line position in FIG. 5, and shows a state wherein the second member is not pushed in.

FIG. 10 is a cross-sectional view at the B-B line position in FIG. 5, and shows a state wherein the second member is pushed in.

FIG. 26 is a cross-sectional view at a C-C line position in FIG. 25, and shows a state wherein the second member is not pushed in.

FIG. 27 is a cross-sectional view at the C-C line position in FIG. 25, and shows a state wherein the second member is pushed in.

BEST MODES OF CARRYING OUT THE INVENTION

Figure 1:
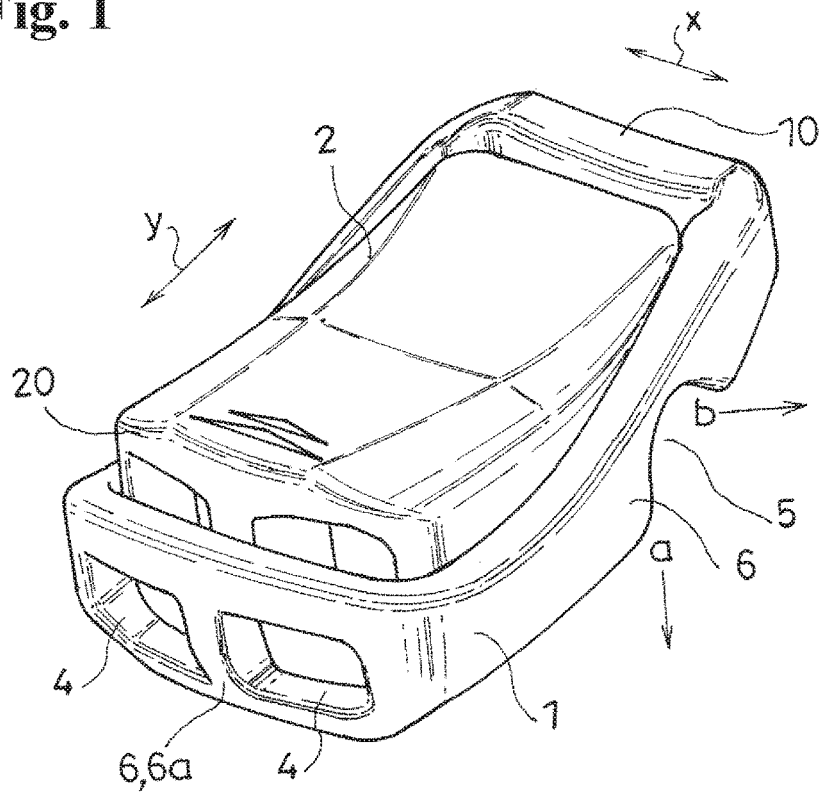
FIG. 1 is a perspective view of a cord lock (the first example) according to one embodiment of the present invention.

Hereinafter, based on FIG. 1 to FIG. 37, typical embodiments of the present invention will be explained. A cord lock according to the present embodiment can be fastened to an arbitrary position of a cord R, and is formed in such a way as to release this fastening state by operating a second member 2 to be pushed in against urging.

Such cord R may have any shape (a round string, a flat string, and the like), any material, or any structure (a knitted string, an elastic string, a string made of synthetic resin, and the like) provided that the cord lock can be fastened in the aforementioned manner. Typically, such cord lock is fastened to the cord R in various types of articles provided with a portion which is narrowed or tightened by the aforementioned cord R, and is used in such a way as to narrow or loosen the aforementioned portion by changing a fastening position thereof.

Such cord lock comprises a first member 1, a second member 2, and an urging device 3.

The first member 1 includes first passage portions 4 and second passage portions 5 of the cord R. In an example shown in the drawings, the first member 1 includes side face portions 6 and a bottom face portion 7, and supports the second member 2 inside the side face portions 6 and the bottom face portion 7 so as to be capable of moving to rise and fall.

The second member 2 is combined with the first member 1 so as to be capable of moving to rise and fall at a support point 19 on the second passage portions 5 side, and includes third passage portions 21 positioned between the first passage portions 4 and the second passage portions 5 on a free end 20 side of the aforementioned rising and falling movement, and passing the cord R through.

The support point 19 is formed by an engaging portion formed in one of the first member 1 and the second member 2; and an engaged portion formed in the other of those, and engaged with the engaging portion.

The urging device 3 urges the second member 2 in a standing direction. In the first example shown in FIG. 1 to FIG. 18, a second example shown in FIG. 19, a third example shown in FIG. 20 and FIG. 21, and a fourth example shown in FIG. 22 and FIG. 23, such urging device 3 is formed by a compression coil spring 28. On the other hand, in a fifth example shown in FIG. 24 to FIG. 36, and a sixth example shown in FIG. 37, such urging device 3 is formed by one portion of the second member 2.

The cord R can pass relative to the cord lock in such a way as to be inserted from the first passage portion 4 and be pulled out of the second passage portion 5 through the third passage portion 21 in a state wherein the first passage portion 4 and the third passage portion 21 are matched so as to be capable of passing the cord R by pushing the second member 2 against the urging of the urging device 3. Alternatively, the cord R can pass relative to the cord lock in such a way as to be inserted from the second passage portion 5 and be pulled out of the first passage portion 4 through the third passage portion 21 in the state wherein the first passage portion 4 and the third passage portion 21 are matched so as to be capable of passing the cord R through by pushing the second member 2 against the urging of the urging device 3. Thus, after the cord R passes through the cord lock, when the pushing of the second member 2 is stopped, the second member 2 turns in the standing direction by the urging of the urging device 3 so as to have a state wherein the first passage portion 4 and the third passage portion 21 do not match, thereby the cord lock is fastened to the cord R. Incidentally, the pushing of the second member 2 includes a case wherein such second member 2 is relatively pushed in as well.

In a case wherein the support point 19 is formed by a shaft and a shaft hole, typically, in order to provide the shaft hole, a certain thickness becomes necessary for the side face portion 6 of the first member 1. Also, in a case wherein the support point 19 is formed in such a way as to pass the cord R through, a thickness on the support point 19 side of the cord lock cannot have a thickness of the cord R or less. On the other hand, in the cord lock according to the present embodiment, such support point 19 is formed by the engaging portion and the engaged portion, and the cord R pulled out of the second passage portion 5 is positioned on the free end 20 side of the second member 2 more than the support point 19, so that the support point 19 can be formed in such a way not to influence to the thickness and the like of the cord lock.

More specifically, in the first example to the fourth example, the engaging portion is formed by an engagement claw 22, and the engaged portion is formed by an engagement hole 8 with which the engagement claw 22 is engaged.

Figure 12:
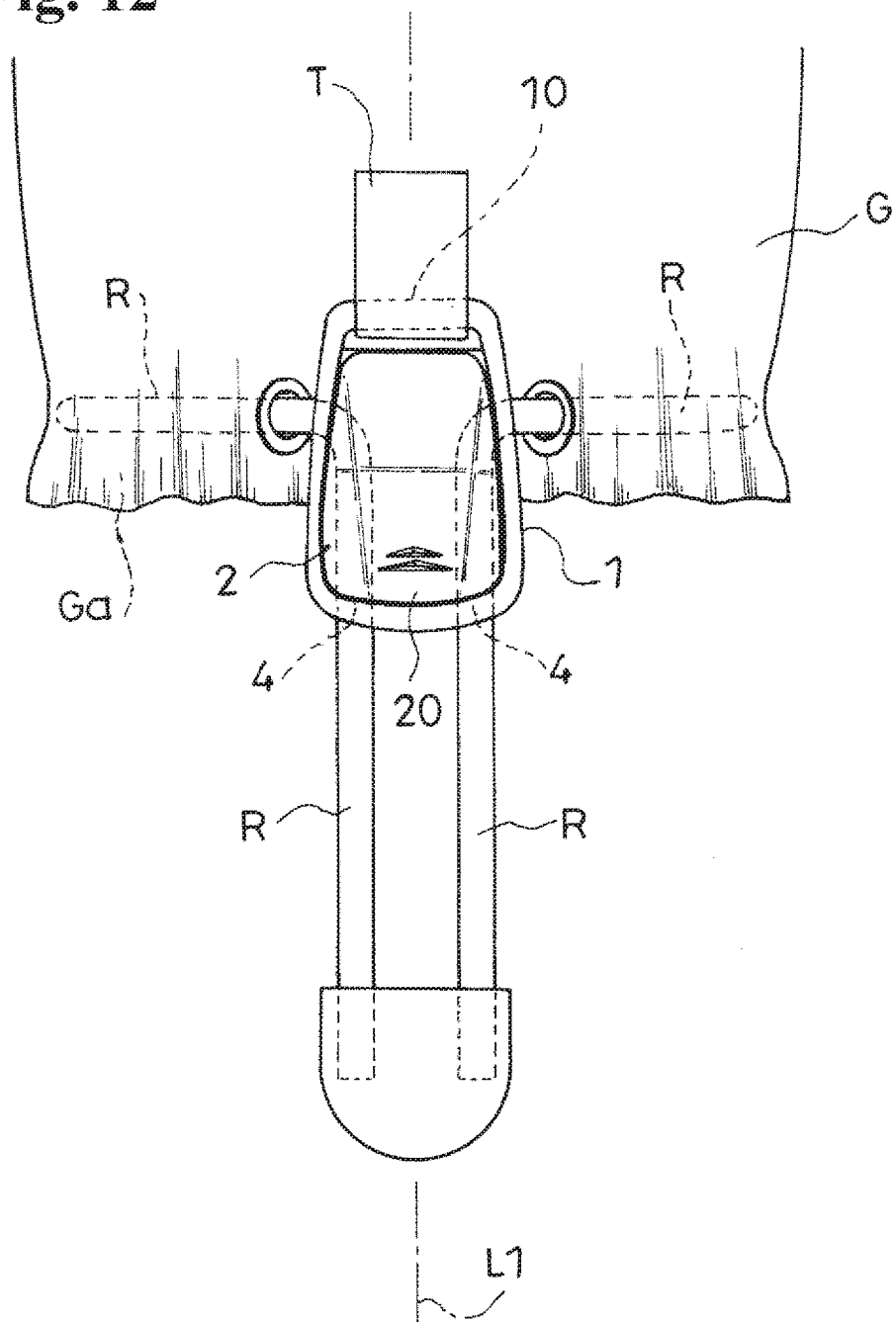
FIG. 12 is an enlarged front view of essential parts showing the state wherein the first example is used for the glove.
Figure 13:
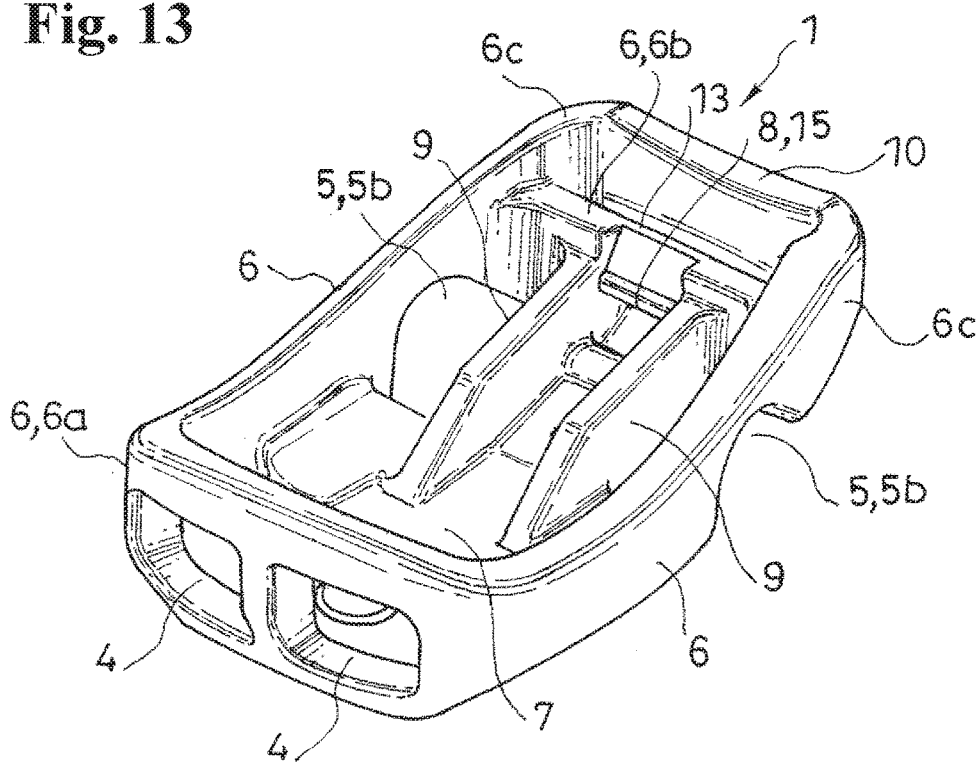
FIG. 13 is a perspective view of a first member forming the first example.
Figure 14:
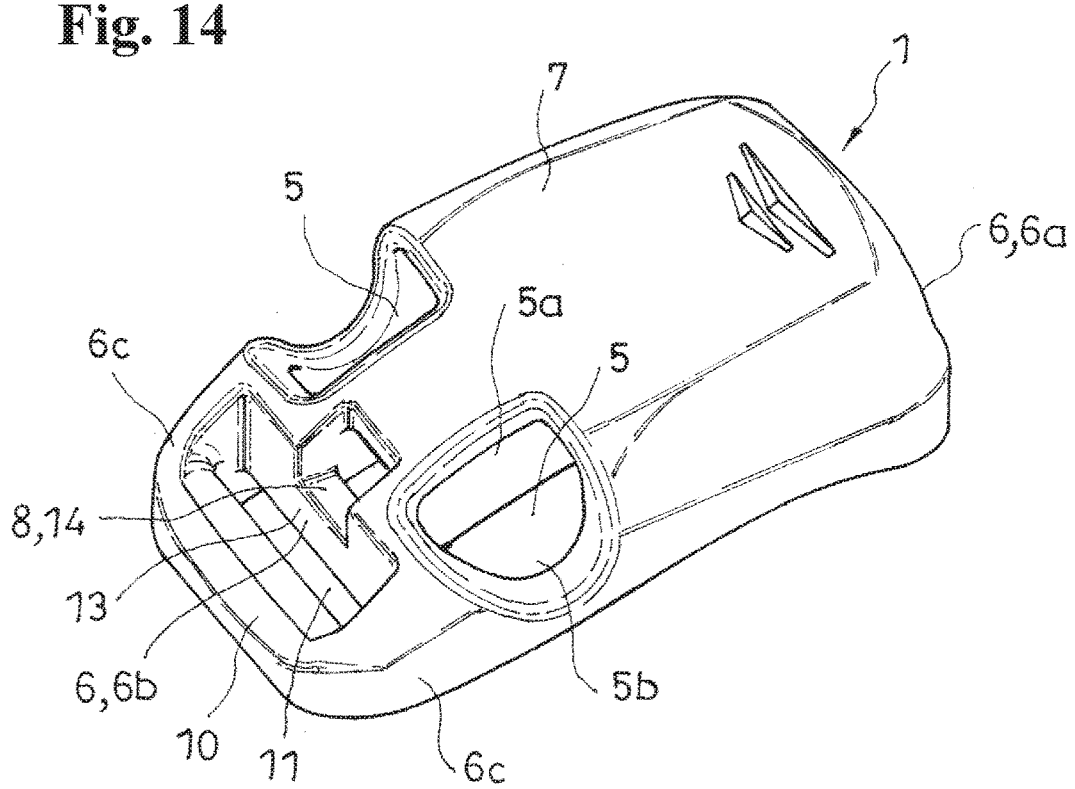
FIG. 14 is a perspective view of the first member forming the first example, and shows the first member viewed from a lower side in FIG. 13.

At least one portion of the second passage portion 5 is positioned on the free end 20 side of the second member 2 more than the support point 19. Thereby, in the cord lock according to the present embodiment, in a state wherein although the cord R passing through in the cord lock as mentioned above is straight between the first passage portion 4 and the second passage portion 5, the cord R bends or curves at the second passage portion 5 to be pulled out to a side just in front (the free end 20 side) more than the support point 19, and the cord lock can be fastened to such cord R (FIG. 12).

Figure 19:
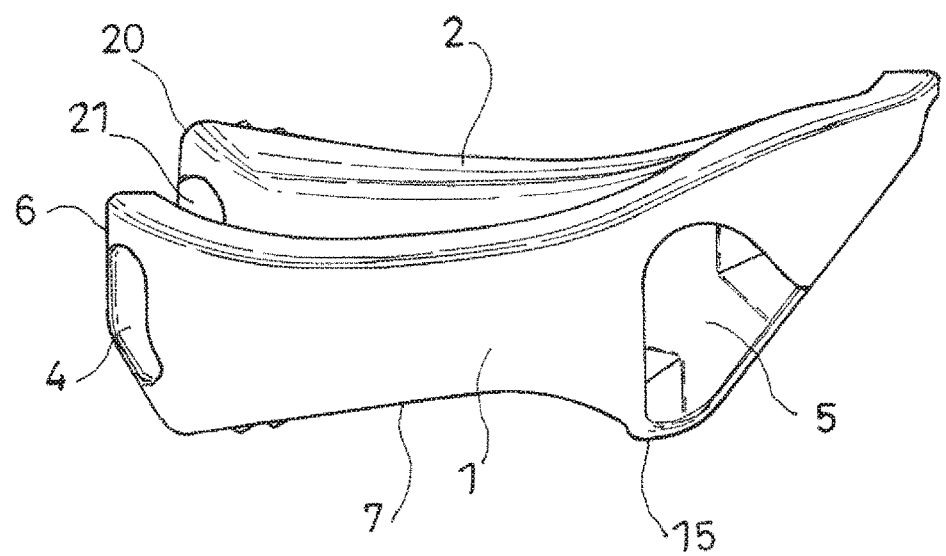
FIG. 19 is a side view of the cord lock (a second example) according to one embodiment of the present invention.
Figure 20:
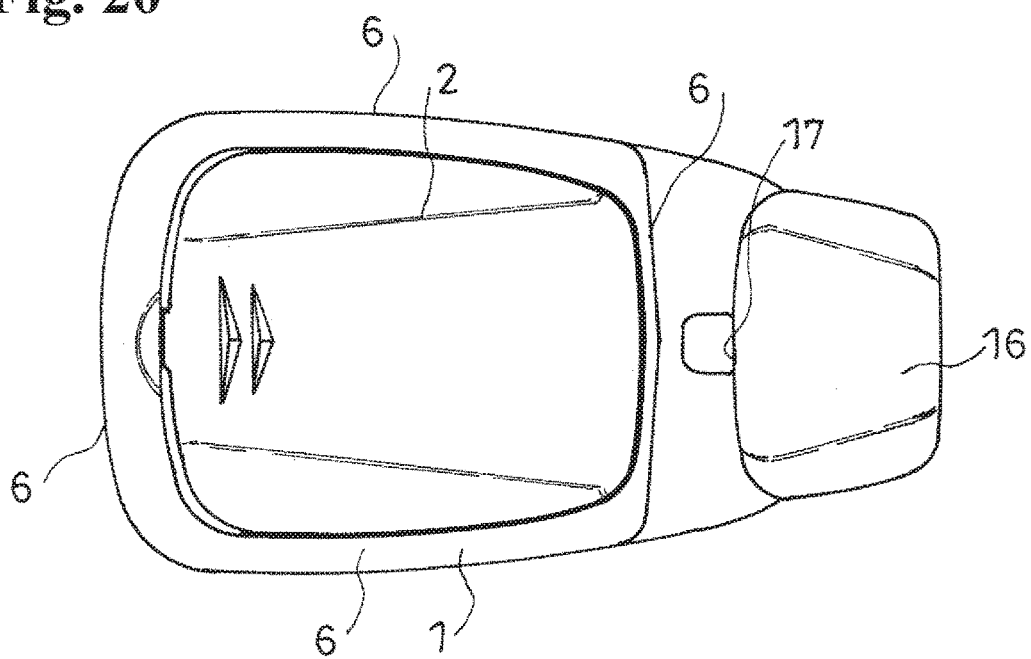
FIG. 20 is a front view of the cord lock (a third example) according to one embodiment of the present invention.
Figure 21:
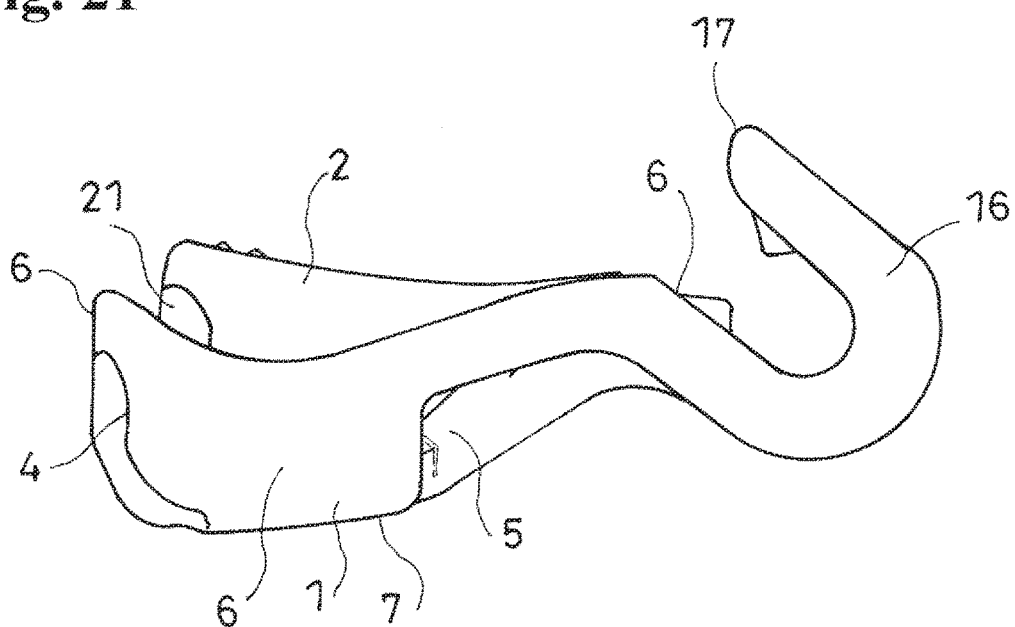
FIG. 21 is a side view of the cord lock (the third example) according to one embodiment of the present invention.

Also, in the first example shown in FIG. 1 to FIG. 18, the second example shown in FIG. 19, and the third example shown in FIG. 20 and FIG. 21, the second passage portion 5 is formed across the side face portion 6 and the bottom face portion 7. Thereby, in the first example to the third example, moreover, without increasing the thickness of the first member 1, an area of the second passage portion 5 can be maximized, and the cord lock can be fastened to the cord R in such a way that the cord R is pulled out further in a free direction from the second passage portion 5.

Figure 11:
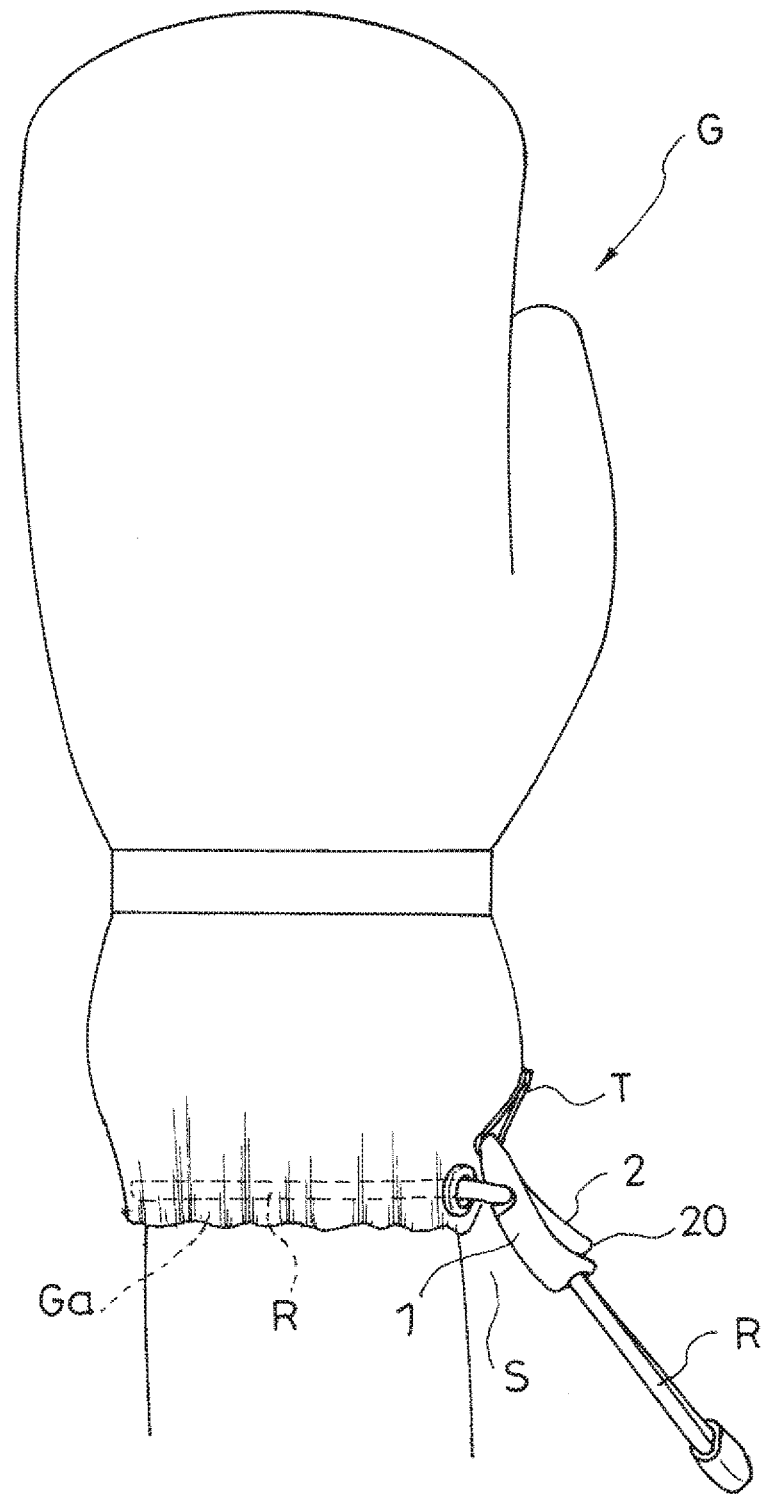
FIG. 11 is a structural view showing a state wherein the first example is used for a glove.

Also, the cord lock according to the first example to the third example bends or curves at the bottom face portion 7 of the first member 1 in such a way that the support point 19 side becomes an inside of bending or curving. In such a case, in a case wherein the cord R pulled out of the second passage portion 5 functions in such a way as to narrow one portion of an article, a gap S is formed between the bottom face portion 7 of the first member 1 positioned on the free end 20 side of the second member 2 and an outer face of the article, and the cord lock can be provided in such article in such a way that the bottom face portion 7 of the first member 1 on the support point 19 side is tightly attached to the outer face of the article, so that a push-in operation of the second member 2 which releases the fastening of the cord R becomes easy. For example, as shown in FIG. 11, the cord lock can be fastened to the cord R narrowing an opening Ga of a glove G in a state of forming the gap S between the bottom face portion 7 of the first member 1 positioned on the free end 20 side of the second member 2 and an outer face on an opening Ga side of the glove G.

Also, the cord lock according to the first example to the third example comprises a guide wall guiding the cord R inserted from one of the first passage portion 4 and the second passage portion 5 to the other of those. In such a case, in a case wherein although the cord R passing through in the cord lock as mentioned above is straight between the first passage portion 4 and the second passage portion 5, the cord R bends or curves at the second passage portion 5 to be pulled out to the side; the cord R inserted from the second passage portion 5 side can be reliably guided to the first passage portion 4.

More specifically, in the cord lock according to the first example to the third example, the guide wall is formed by first guide walls 9 (for example, see FIG. 15 regarding the first example) formed inside the first member 1; and second guide walls 23 formed inside the second member 2, and forming one portion of an insertion passage of the cord R together with the first guide walls 9 in a state wherein the second member 2 falls against the urging of the urging device 3.

Figure 9:
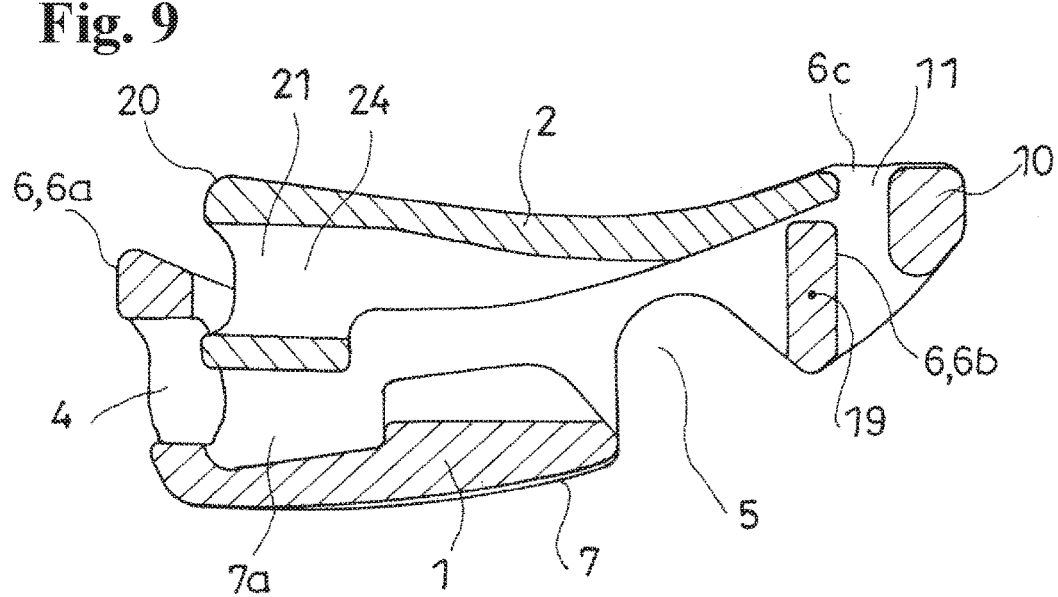
Figure 10:
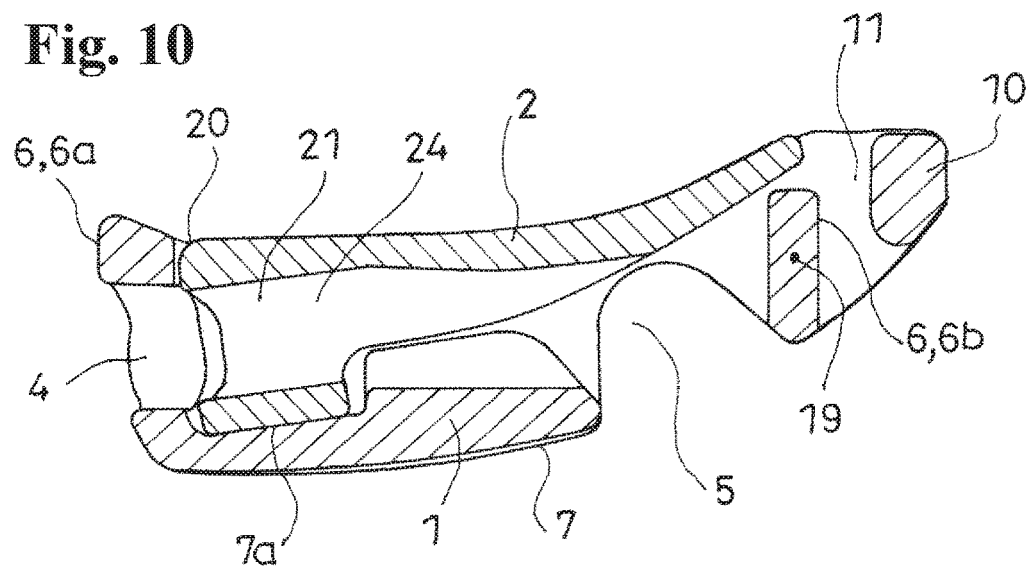

Also, in the cord lock according to the first example to the third example, on the bottom face portion 7 of the first member 1, in a state wherein the second member 2 is operated to be pushed in against the urging of the urging device 3, there comprises a concave portion 7a housing the free end 20 side of the second member 2 so as not to generate a step between the third passage portion 21 and the bottom face portion 7 (for example, see FIG. 9 and FIG. 10 regarding the first example). In such a case, especially, the cord R inserted from the second passage portion 5 side can be smoothly guided to the first passage portion 4.

First Example

The cord lock of the first example shown in FIG. 1 to FIG. 18 has a structure comprising a length and a width. In the first example, the cord R passes respectively on a left side and a right side sandwiching a virtual center line L1 (FIG. 12 and FIG. 15) passing a position of an approximately middle in a width direction of the cord lock.

Specifically, in the example shown in the drawings, one terminal side of the cord R narrowing the opening Ga of the glove G is pulled out of the first passage portion 4 on the left side through the second passage portion 5 on the left side sandwiching the center line L1 of the cord lock, and the other terminal side of the cord R narrowing the opening Ga of the glove G is pulled out of the first passage portion 4 on the right side through the second passage portion 5 on the right side sandwiching the center line L1 of the cord lock (FIG. 12).

Figure 2:
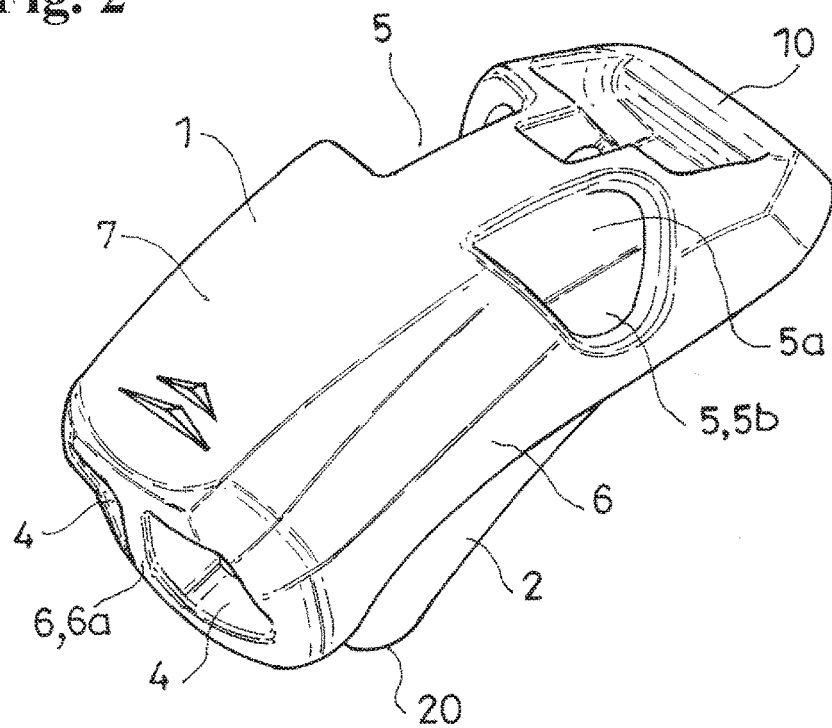
FIG. 2 is a perspective view of the first example, and shows the first example viewed from a lower side in FIG. 1.
Figure 3:
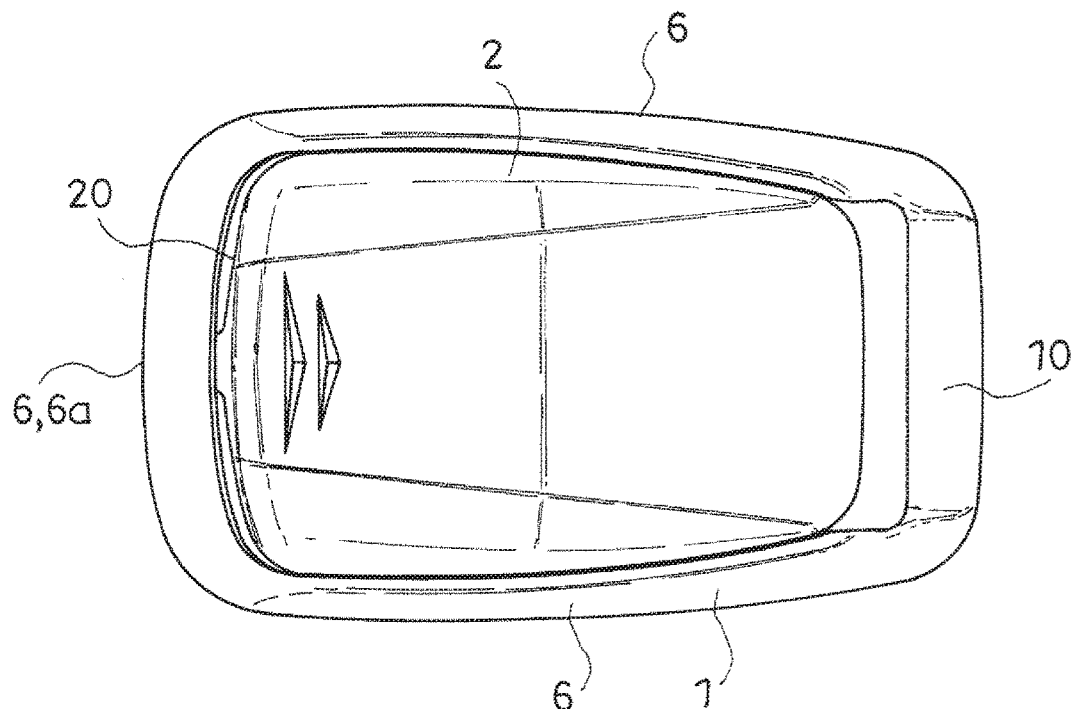
FIG. 3 is a front view of the first example.
Figure 4:
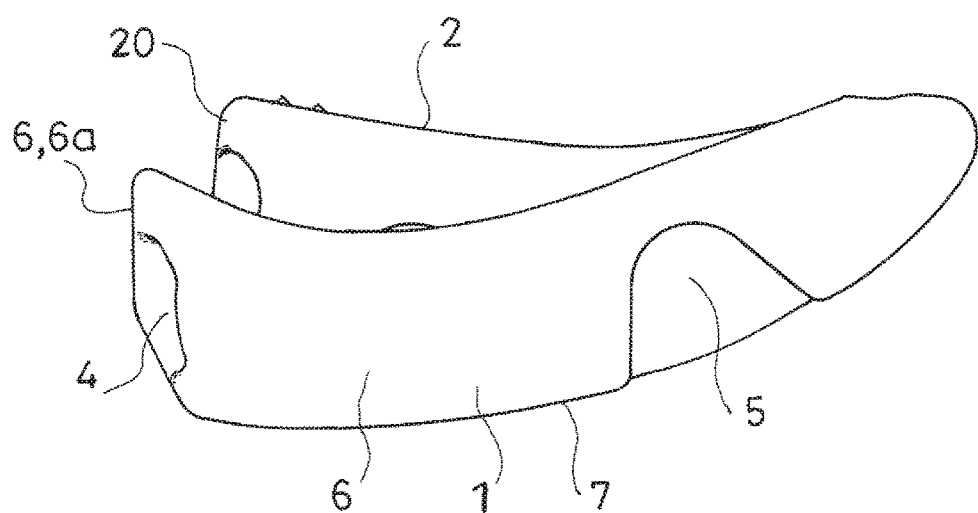
FIG. 4 is a side view of the first example.
Figure 5:
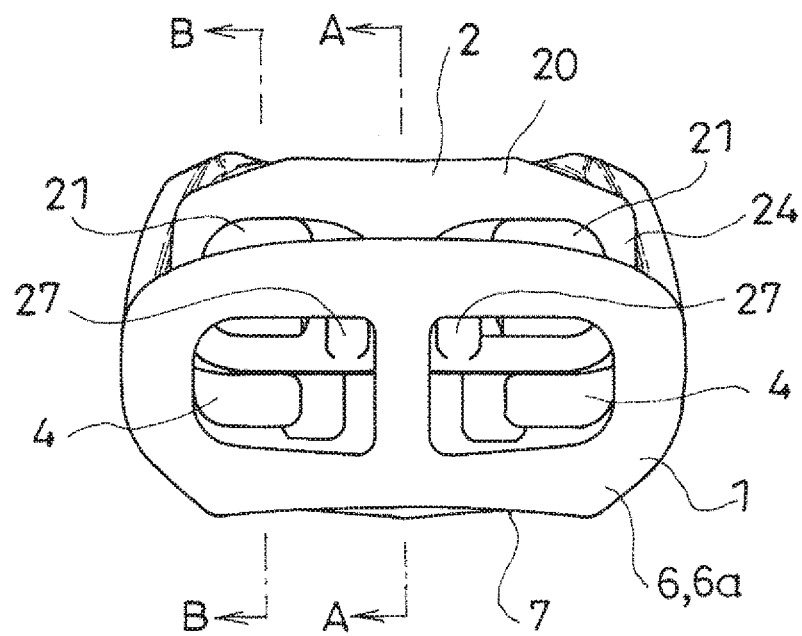
FIG. 5 is a side view of the first example, and shows the first example viewed from a left side in FIG. 4.
Figure 6:
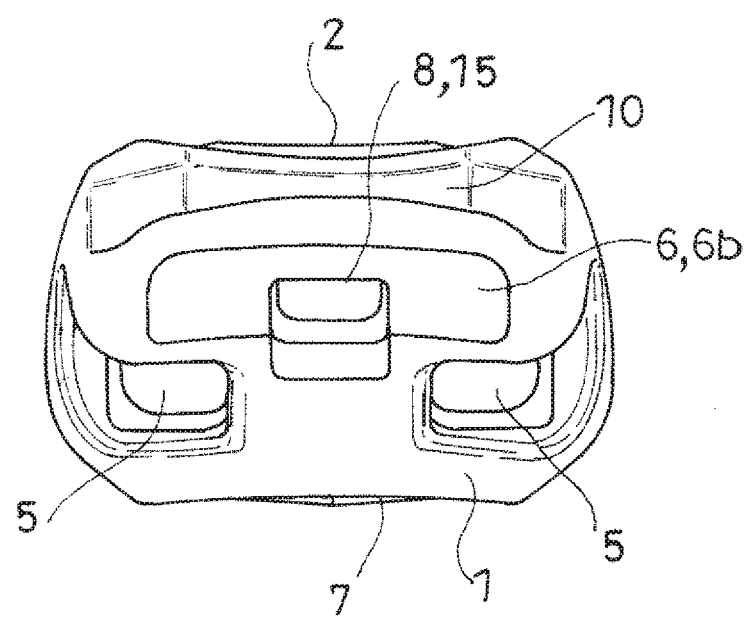
FIG. 6 is a side view of the first example, and shows the first example viewed from a right side in FIG. 4.

The first member 1 comprises the bottom face portion 7 forming a plate shape; a pair of length-direction side face portions 6 forming a wall shape rising from edge portions in a length direction of such bottom face portion 7 along a length direction of the cord lock; and a pair of width-direction side face portions 6 forming the wall shape rising from the edge portions in a width direction of the bottom face portion 7 along the width direction of the cord lock, and the first member 1 opens a side facing the bottom face portion 7 (see FIG. 1 and FIG. 2).

The bottom face portion 7 curves such that the open side becomes a curvature inside in the length direction of the cord lock.

In one of the pair of width-direction side face portions 6 of the first member 1 (hereinafter, called a front-side side face portion 6a), there is formed the first passage portion 4 substantially having a square hole shape.

The second passage portions 5 are respectively formed on both sides sandwiching the center line L1 between a virtual first width-direction line segment L2 (see FIG. 15) orthogonal to the center line L1 at a position of an approximately middle in the length direction of the cord lock, and the other of the pair of width-direction side face portions 6 (hereinafter, called a back-side side face portion 6b). The second passage portion 5 is formed by a first hole portion 5a substantially having a square shape passing through the bottom face portion 7 between the later-described first guide wall 9 and the length-direction side face portion 6; and a second hole portion 5b notching the side face portion 6 in a mountain shape, and communicating with the first hole portion 5a on a base portion side thereof. The second passage portion 5 is formed across the bottom face portion 7 and the side face portion 6, and the cord R can be pulled out toward an outside (a direction in FIG. 1) of the bottom face portion 7 of the first member 1 through the second passage portion 5, and additionally, toward a side (b direction in FIG. 1) of the side face portion 6 as well.

Figure 7:
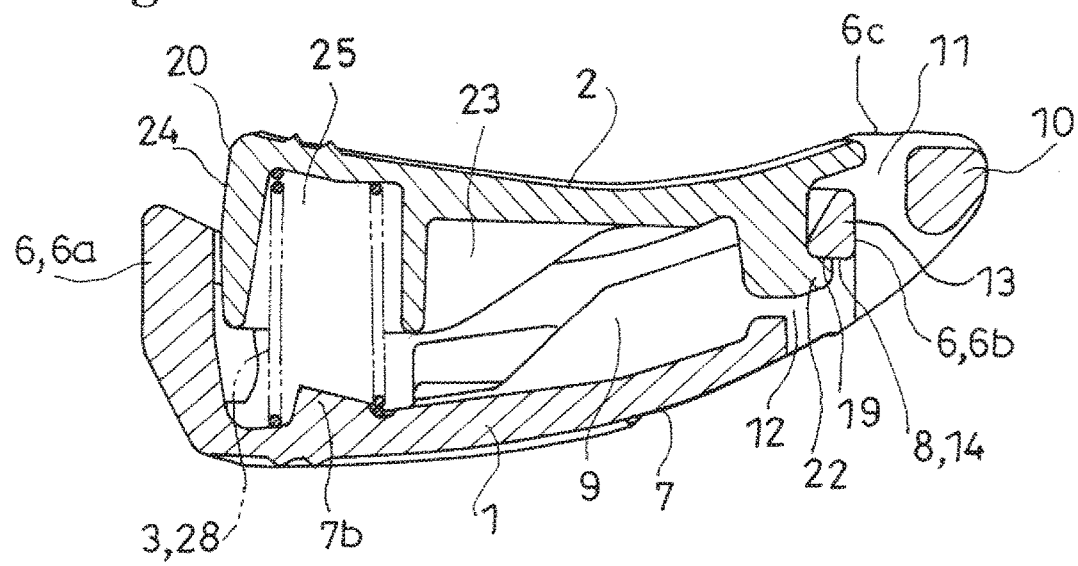

On an outside of the back-side side face portion 6b, there is disposed a wrapping bar 10 for a belt-shaped member T (see FIG. 12) in a state wherein an insertion gap 11 of the belt-shaped member T is formed between the wrapping bar 10 and the back-side side face portion 6b (see FIG. 7). The wrapping bar 10 is disposed between extension portions 6c and 6c of the pair of length-direction side face portions 6 and 6 projecting backwardly more than the back-side side face portion 6b.

Thereby, in the first example, the cord lock can be attached relative to the article wherein the cord R is provided using the belt-shaped member T wrapped in the wrapping bar 10 through the insertion gap 11 in such a way that the article and the cord lock do not separate even in a state wherein the cord R is not inserted to pass through.

Also, the first guide wall 9 along a virtual left-side length-direction line segment L3 (see FIG. 15) parallel to the center line L1 is formed between the center line L1 and the length-direction side face portion 6 on the left side. Also, the first guide wall 9 along a virtual right-side length-direction line segment L4 (see FIG. 15) parallel to the center line L1 is formed between the center line L1 and the length-direction side face portion 6 on the right side. Those first guide walls 9 are formed throughout between the back-side side face portion 6b and the first width-direction line segment L2.

Figure 15:
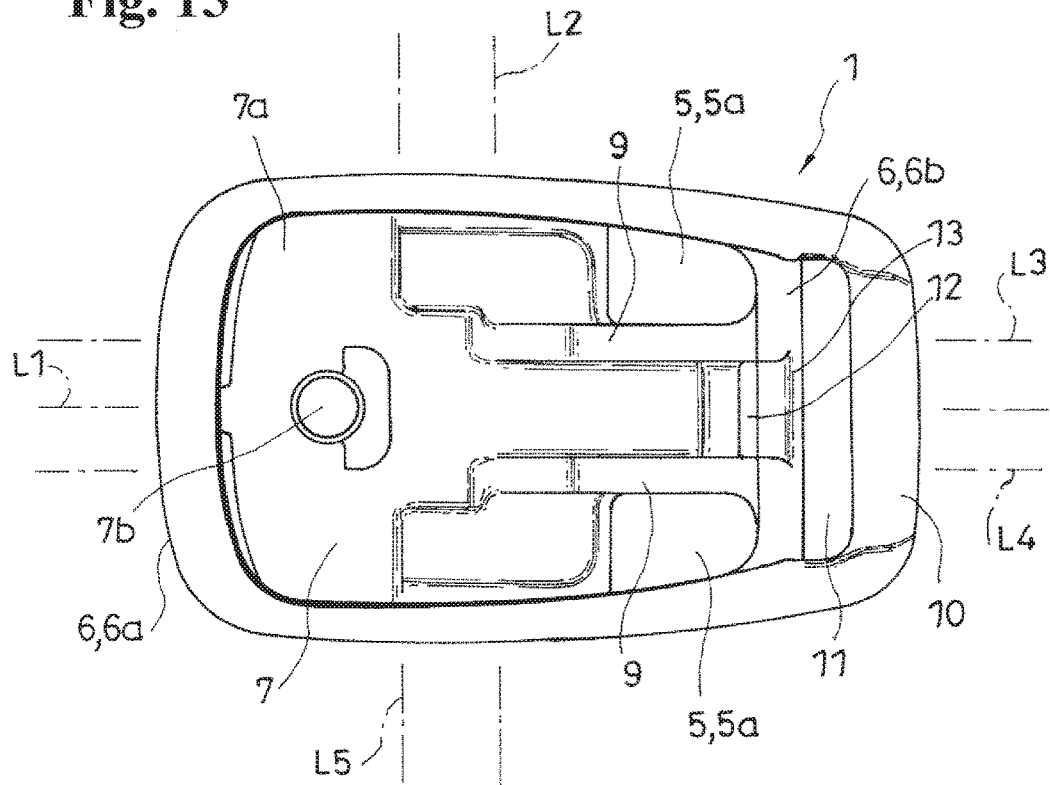
FIG. 15 is a front view of the first member forming the first example.

Also, a slit 12 along the width direction of the cord lock is formed along an inner face of the back-side side face portion 6b between the right and left first guide walls 9 and 9 (see FIG. 7 and FIG. 15). Also, at the position of the approximately middle in the width direction of the cord lock in the back-side side face portion 6b, a notched portion 14 notching the back-side side face portion 6b is formed in such a way as to form a bridge portion 13 on a curvature inside of the bottom face portion 7, and the slit 12 and the notched portion 14 are communicated (see FIG. 7). In the example shown in the drawing, the engagement claw 22 of the second member 2 enters into the notched portion 14, and engages the bridge portion 13. Namely, in the example shown in the drawing, the notched portion 14 becomes the engagement hole 8 functioning as the engaged portion.

The bottom face portion 7 divides between the first width-direction line segment L2 and the front-side side face portion 6a, and an inner face between a virtual second width-direction line segment L5 (see FIG. 15) parallel to the first width-direction line segment L2 and the front-side side face portion 6a is lower than an inner face between the second width-direction line segment L5 and the second passage portion 5. Thereby, the first member 1 comprises the concave portion 7a on a front-side side face portion 6a side (see FIG. 9).

On an inner face of the bottom face portion 7, between the second width-direction line segment L5 and the front-side side face portion 6a, and on the center line L1, there is formed a projection 7b which can be housed inside one end of the compression coil spring 28 as the urging device 3 (see FIG. 7).

Figure 16:
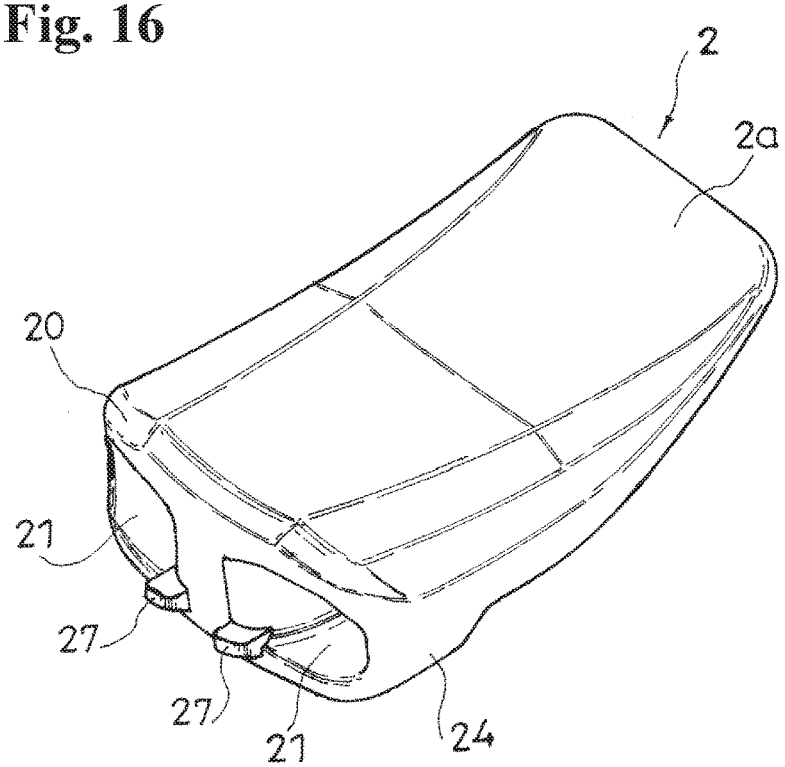
FIG. 16 is a perspective view of the second member forming the first example.

The second member 2 includes the front-side side face portion 6a and the back-side side face portion 6b of the first member 1; and a base plate portion 2a surrounded by the length-direction side face portions 6 on the right and left, and having a shape matching an inner outline shape of an open portion of the first member 1 (see FIG. 16). The second member also comprises the width and the length. Also, the base plate portion 2a of the second member 2 comprises a curvature following a curvature of the base plate portion 2a of the first member 1.

On the free end 20 side of the second member 2, there is formed an enlarged portion 24 projecting toward the bottom face portion 7 side of the first member 1. The enlarged portion 24 is formed throughout the width direction of the second member 2.

On the right and left sandwiching the center line L1 (see FIG. 12 and FIG. 18), there are respectively formed the third passage portions 21. Such third passage portion 21 has a tunnel shape continuing in a direction along the center line L1, and passes through the enlarged portion 24 (see FIG. 16).

Figure 17:
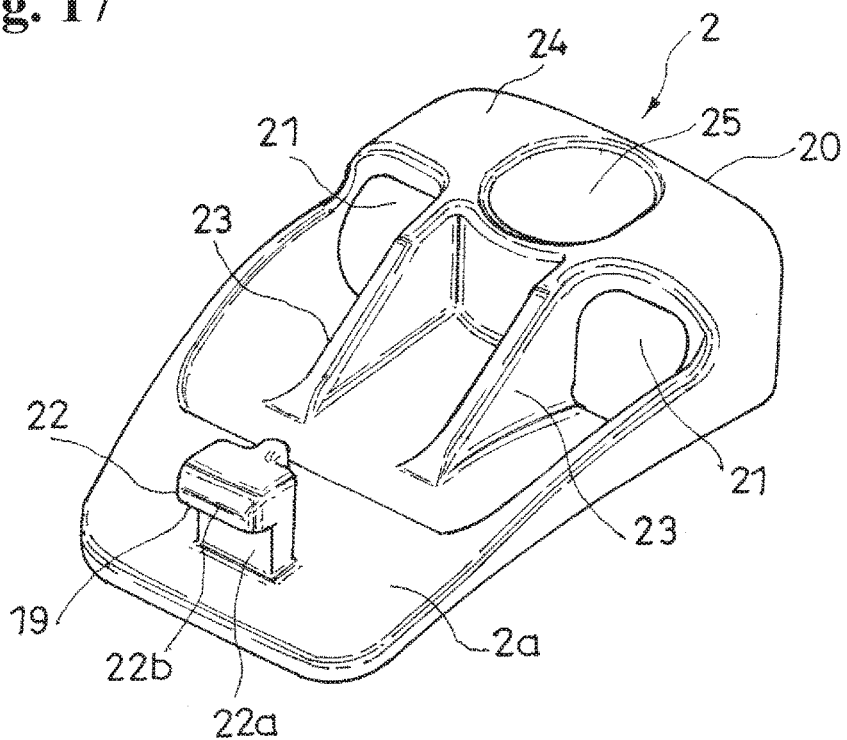
FIG. 17 is a perspective view of the second member forming the first example, and shows the second member viewed from a lower side in FIG. 16.
Figure 18:
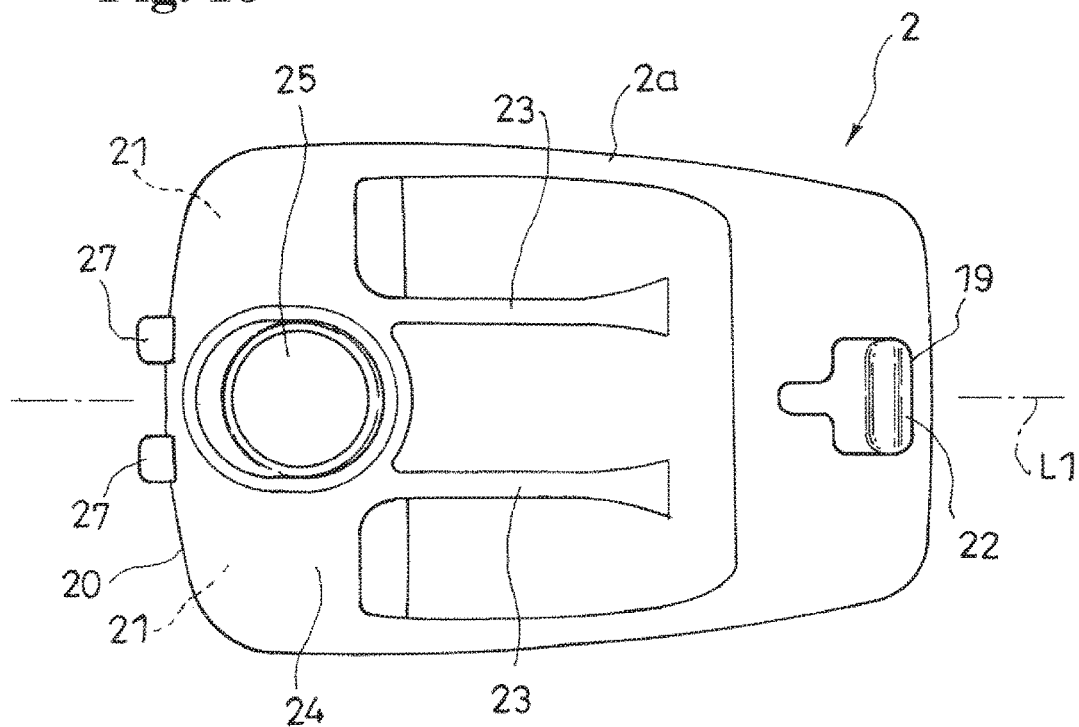
FIG. 18 is a rear view of the second member forming the first example.

Between the third passage portions 21 on the right and left, and in the enlarged portion 24, there is formed a bottomed hole 25 in which the compression coil spring 28 as the urging device 3 can be housed, and the other end of such spring 28 abuts against a bottom of the bottomed hole 25 (see FIG. 17).

Also, on an inner face of the base plate portion 2a of the second member 2, there are formed the second guide walls 23 forming the guide walls together with the first guide walls 9 of the first member 1 respectively on the right and left sandwiching the center line L1 (see FIG. 17). The second guide wall 23 is formed throughout between the enlarged portion 24 and a position of an approximately middle in the length direction of the second member 2 in such a way as to continue to a hole wall on the center line L1 side of the third passage portion 21.

On the support point 19 side of the second member 2, there is formed the engagement claw 22 which becomes the engaging portion (see FIG. 17). The engagement claw 22 is formed by a projection 22b projecting to a side opposite to the enlarged portion 24 formed at a tip of an elastic leg 22a projecting from the inner face of the base plate portion 2a on the center line L1.

Also, at a projecting end of the enlarged portion 24, and on a side opposite to the support point 19 side, there are formed retainer projections 27 which are caught on the first passage portions 4 inside the first member 1 (see FIG. 16).

The first member 1 and the second member 2 are combined by one-touch operation by pushing the second member 2 into the first member 1 while interposing the spring 28 between the first member 1 and the second member 2 using the bottomed hole 25 and the projection 7b. Namely, by the engagement claw 22 pressed against the bridge portion 13 by the aforementioned pushing, the bridge portion 13 and the elastic leg 22a cause an elastic deformation once to allow the engagement claw 22 to climb over the bridge portion 13, thereby, when the engagement claw 22 enters into the notched portion 14, the engagement claw 22 engages the bridge portion 13 by an elastic return, and the second member 2 is combined relative to the first member 1 so as to be capable of moving to rise and fall at the engagement portion as the support point 19.

Figure 8:
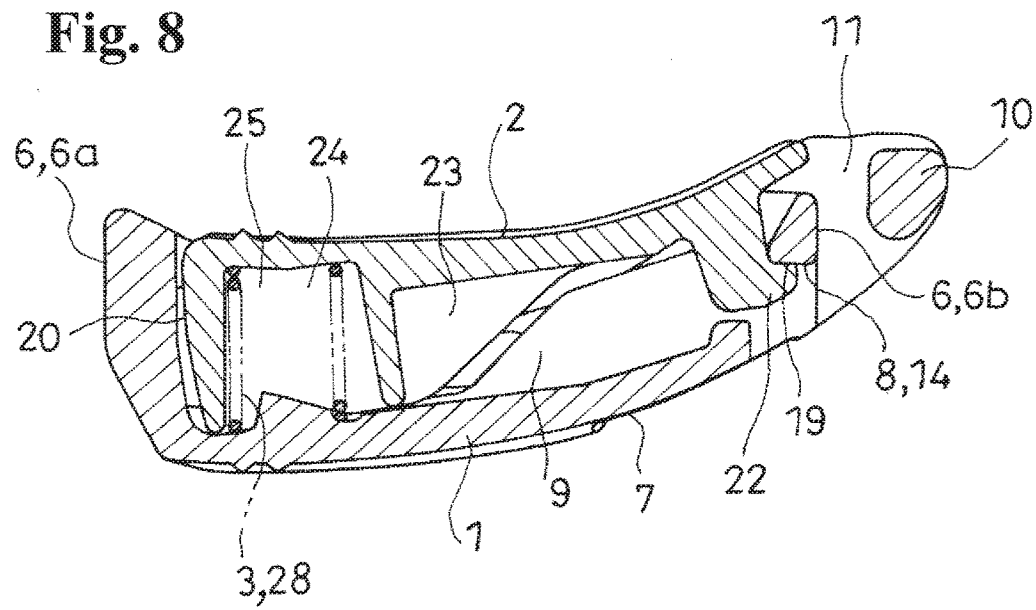

In a state wherein the cord R does not pass, the second member 2 is positioned at a standing position where the retainer projection 27 is caught on the hole wall positioned on a projecting end side of the side face portion 6 of the first passage portion 4 by the urging of the urging device 3. In that state, the first passage portion 4 and the third passage portion 21 do not match, and the cord R cannot pass through the cord lock (FIG. 9). When the cord lock is pinched on the free end 20 side in such a way as to push the free end 20 side of the second member 2 against the urging, the enlarged portion 24 enters into the concave portion 7a inside the cord lock, and the first passage portion 4 and the third passage portion 21 match so as not to form the step between the bottom face portion 7 and the third passage portion 21. Also, the first guide wall 9 and the second guide wall 23 continue by opening a slight gap, and an insertion passage for the tube-shaped cord R is formed between the first passage portion 4 and the second passage portion 5 (FIG. 8 and FIG. 10). Thereby, the cord R can smoothly pass through from the first passage portion 4 toward the second passage portion 5. Also, conversely, the cord R can smoothly pass through from the second passage portion 5 toward the first passage portion 4 as well. After the cord R passes through, when the pushing of the second member 2 is stopped, the second member 2 turns in a direction of separating the free end 20 side from the bottom face portion 7 of the first member 1 around the support point 19 by the urging, and an opening edge of the first passage portion 4 and an opening edge of the third passage portion 21 respectively bite relative to the cord R passing through by the aforementioned turning, so that the cord lock is fastened to the cord R.

Second Example

The cord lock of the second example shown in FIG. 19 bends in such a way that the bottom face portion 7 of the first member 1 forms a top portion 15 at the back of the support point 19. Since the rest of a structure of the second example is substantially the same as that of the first example, the same symbols used in the first example are assigned to the drawings showing the second example, and their explanations are omitted.

Third Example

In the cord lock of the third example shown in FIG. 20 and FIG. 21, the first member 1 comprises a hook portion 16 outside the back-side side face portion 6b. In such hook portion 16, one end of a belt-shaped curvature piece having a U-shaped cross-sectional shape is integrally connected to an outer face of the back-side side face portion 6b. An open end 17 of the hook portion 16 is positioned on an open side of the first member 1. Since the rest of a structure of the third example is substantially the same as that of the first example, the same symbols used in the first example are assigned to the drawings showing the third example, and their explanations are omitted.

Fourth Example

Figure 22:
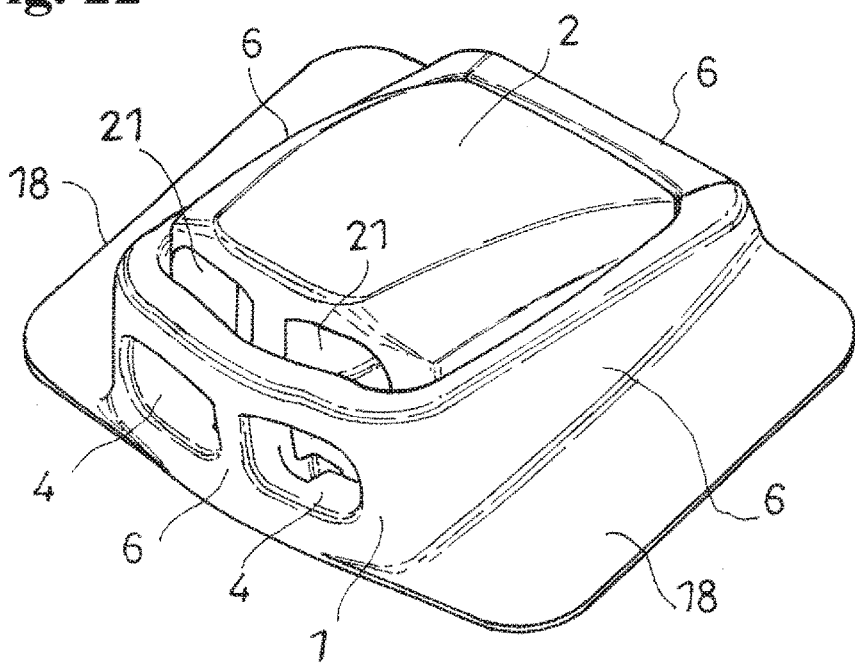
FIG. 22 is a perspective view of the cord lock (a fourth example) according to one embodiment of the present invention.
Figure 23:
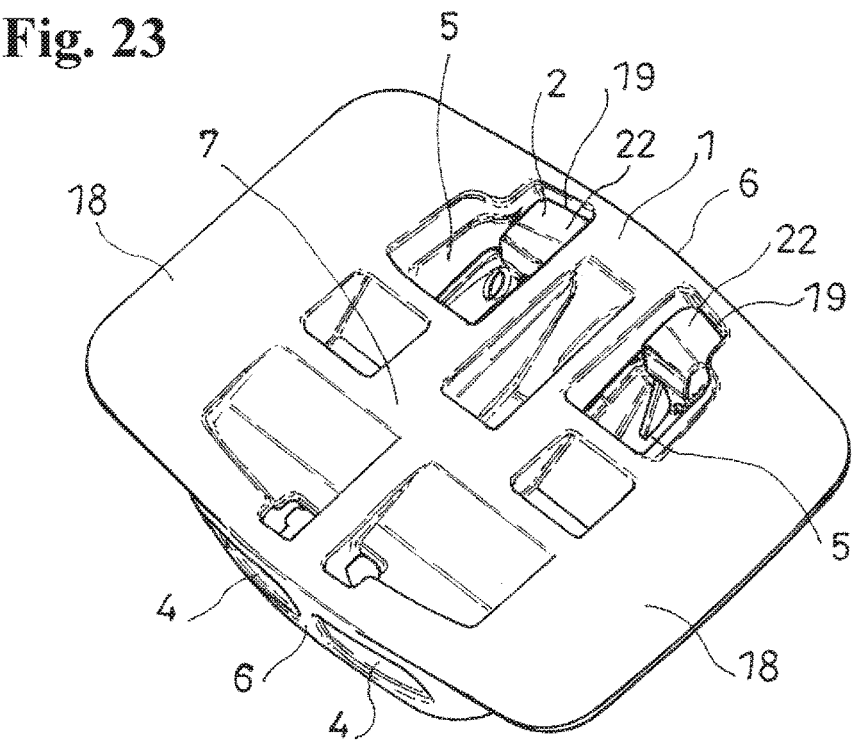
FIG. 23 is a perspective view of the fourth example, and shows the fourth example viewed from a lower side in FIG. 22.
Figure 24:
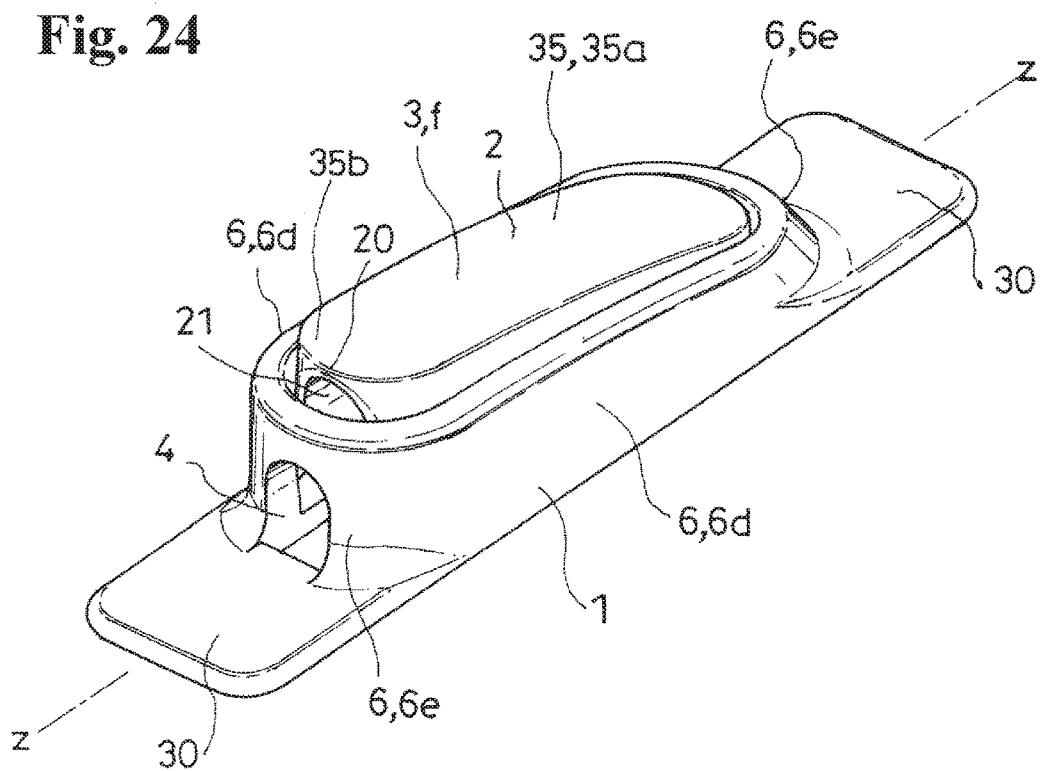
FIG. 24 is a perspective view of the cord lock (a fifth example) according to one embodiment of the present invention.
Figure 25:
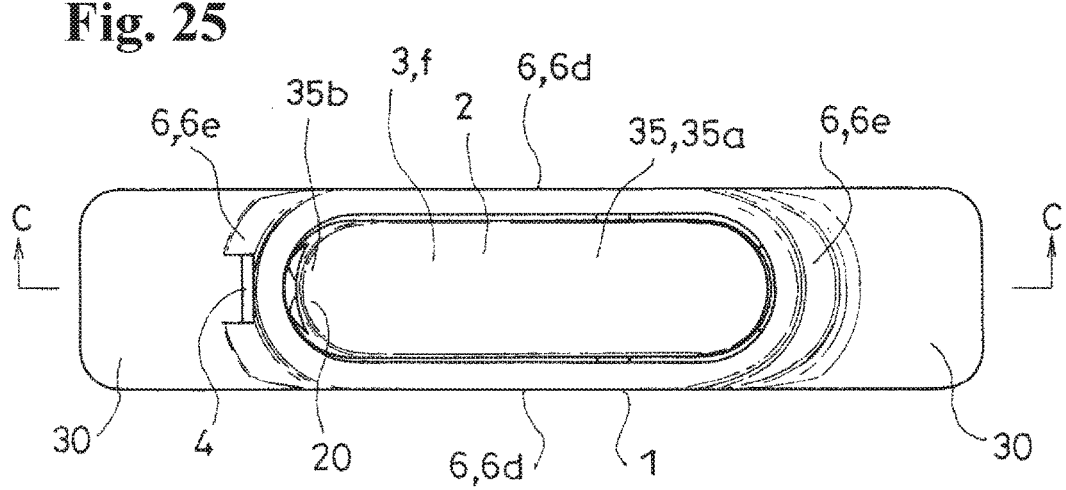
FIG. 25 is a front view of the fifth example.

In the cord lock of the fourth example shown in FIG. 22 and FIG. 23, the first member 1 comprises fin-shaped portions 18 wherein one face thereof continues to an outer face of the bottom face portion 7 outside the length-direction side face portions 6 on the right and left. In the fourth example, using the fin-shaped portions 18, the cord lock can be sewn to a cloth forming clothes, pouches, and the like. In the fourth example, the second passage portion 5 is formed only in the bottom face portion 7. Also, the engaging portion and the engaged portion are provided at two portions on the right and left. Since the rest of a structure of the fourth example is substantially the same as that of the first example, the same symbols used in the first example are assigned to the drawings showing the fourth example, and their explanations are omitted.

Fifth Example

In the cord lock of the fifth example shown in FIG. 24 to FIG. 36, the urging device 3 is formed by an elastically deformable portion f which is one portion of the second member 2, and provided between the third passage portion 5 and the support point 19. Also, the first member 1 comprises a support portion 29 abutting against the elastically deformable portion f to cause the elastic deformation in the elastically deformable portion f (see FIG. 26 and FIG. 27).

In the example shown in the drawings, the cord lock of the fifth example has a structure comprising the length and the width. In the fifth example, one cord R (in the drawings showing the fifth example, the cord R is omitted) passes through the cord lock along a virtual center line z (FIG. 24 and FIG. 29) passing the position of the approximately middle in the width direction of the cord lock.

Figure 26:
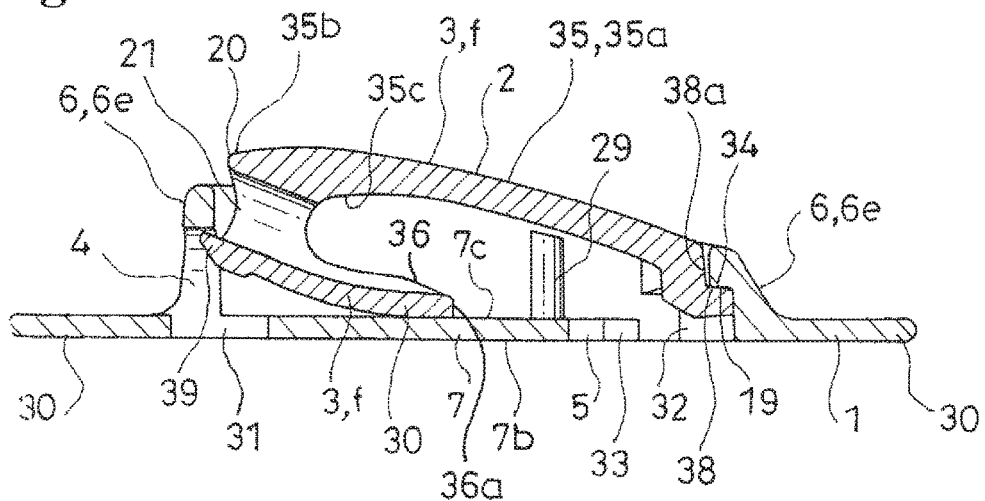
Figure 27:
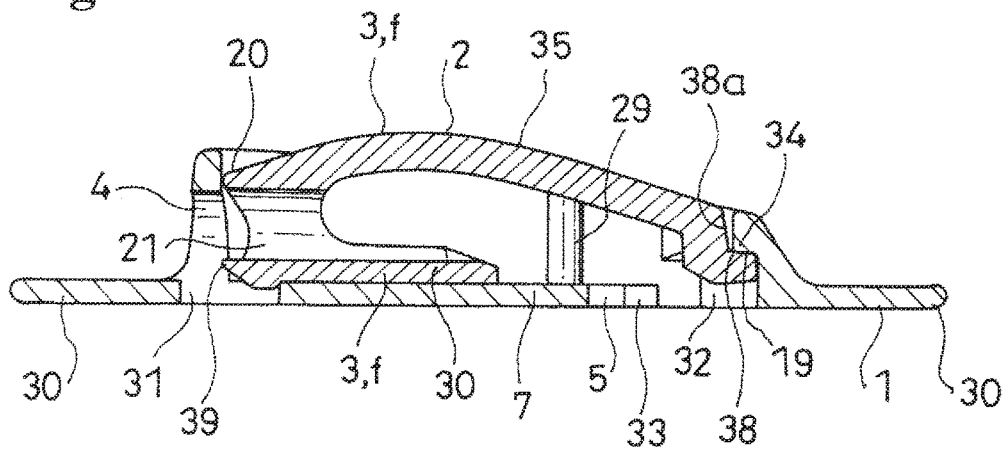
Figure 28:
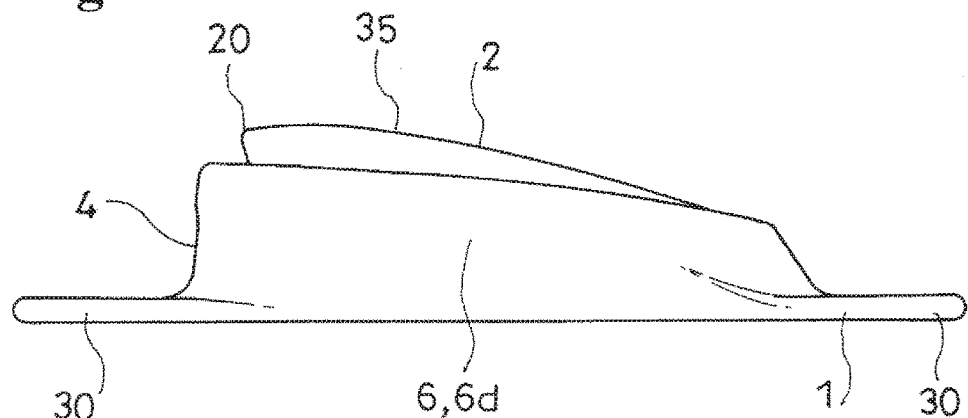
FIG. 28 is a side view of the fifth example.
Figure 29:
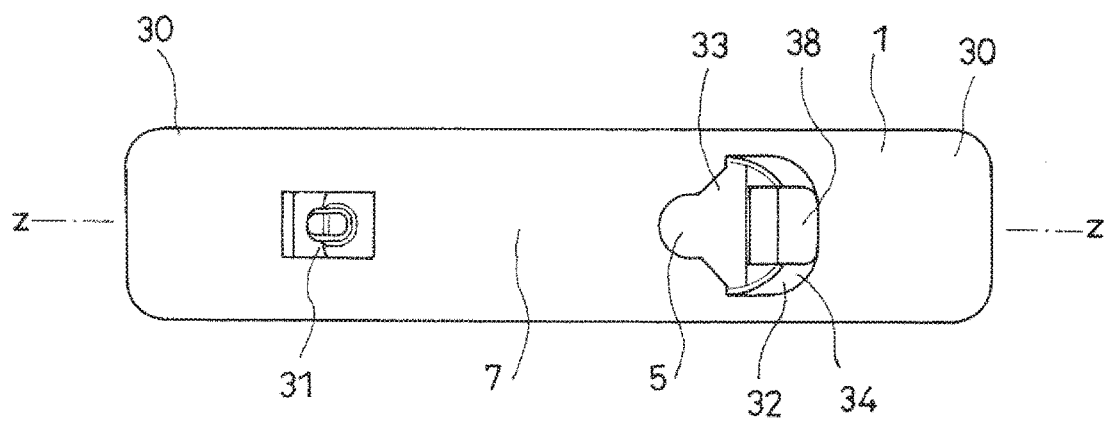
FIG. 29 is a rear view of the fifth example.
Figure 30:
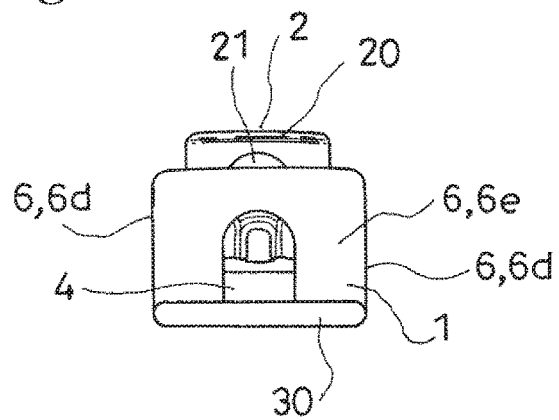
FIG. 30 is a side view of the fifth example, and shows the fifth example viewed from a left side in FIG. 25.
Figure 31:
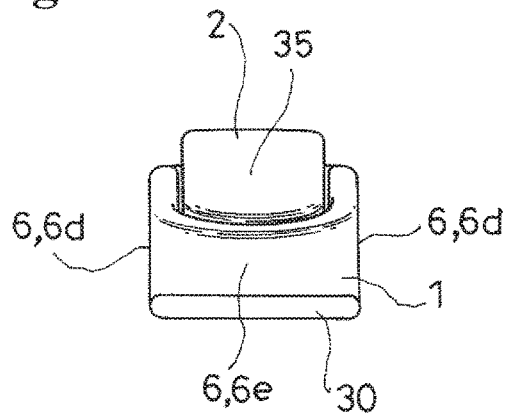
FIG. 31 is a side view of the fifth example, and shows the fifth example viewed from a right side in FIG. 25.
Figure 32:
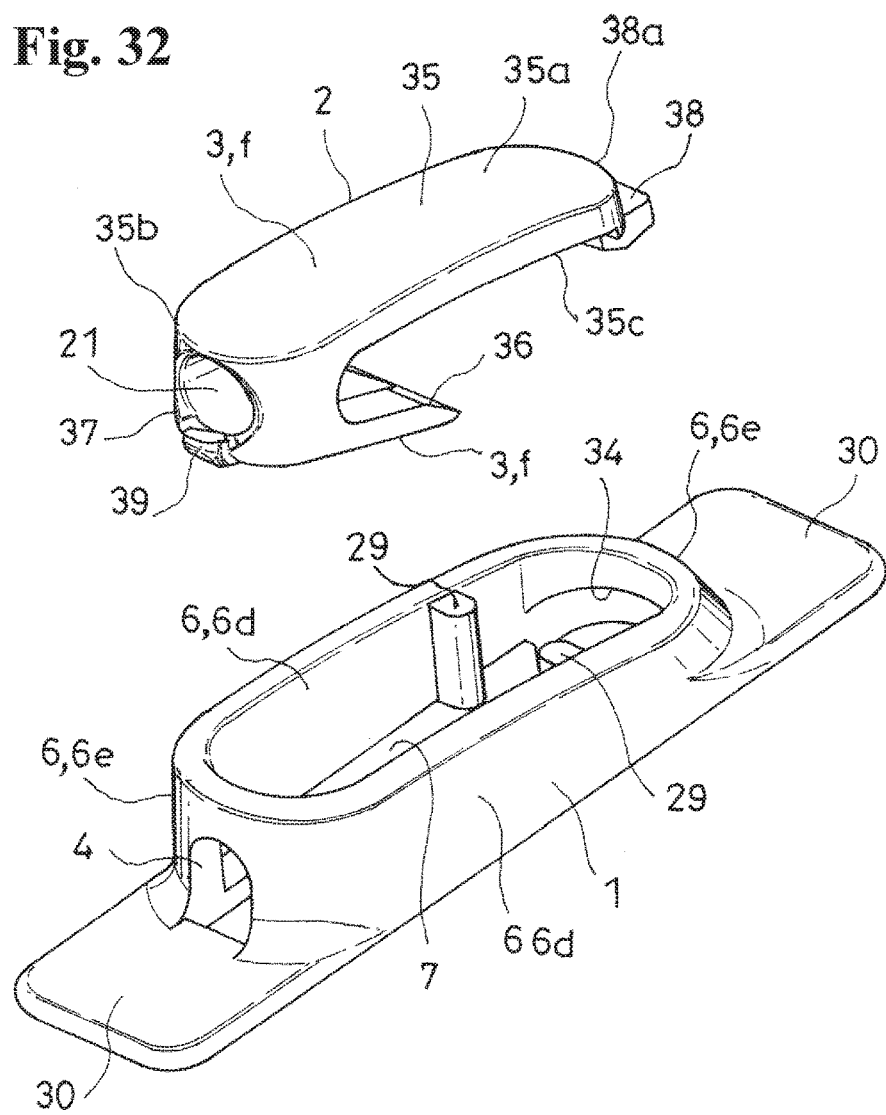
FIG. 32 is an exploded perspective view of the fifth example.
Figure 33:
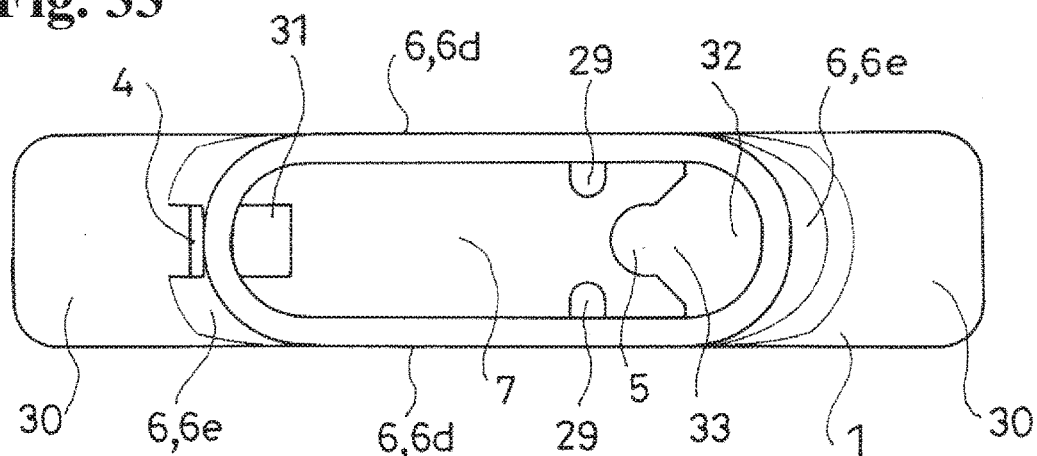
FIG. 33 is a front view of the first member forming the fifth example.
Figure 34:
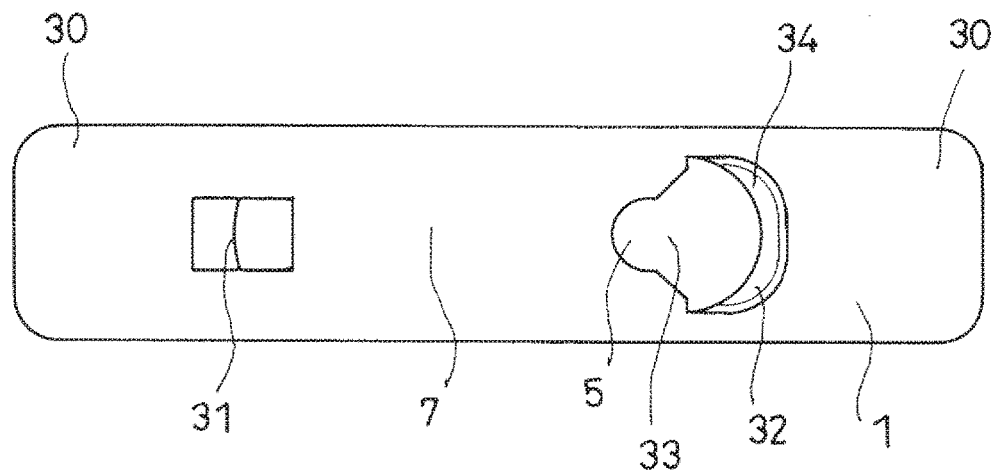
FIG. 34 is a rear view of the first member forming the fifth example.
Figure 35:
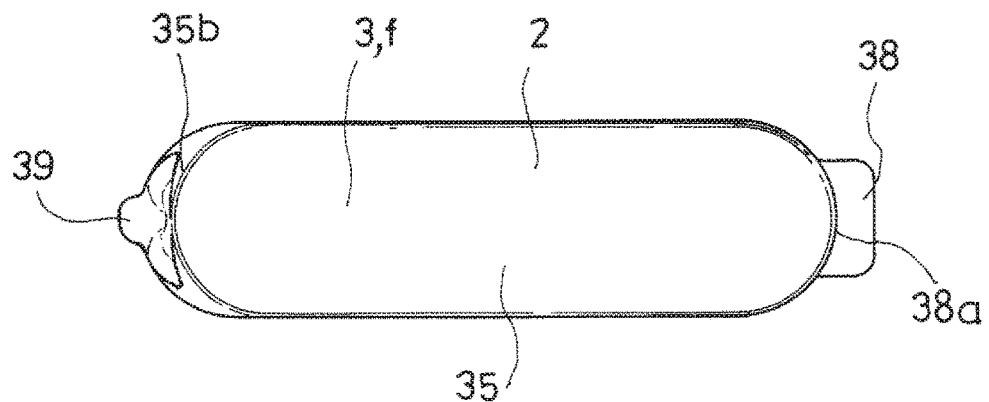
FIG. 35 is a front view of the second member forming the fifth example.
Figure 36:
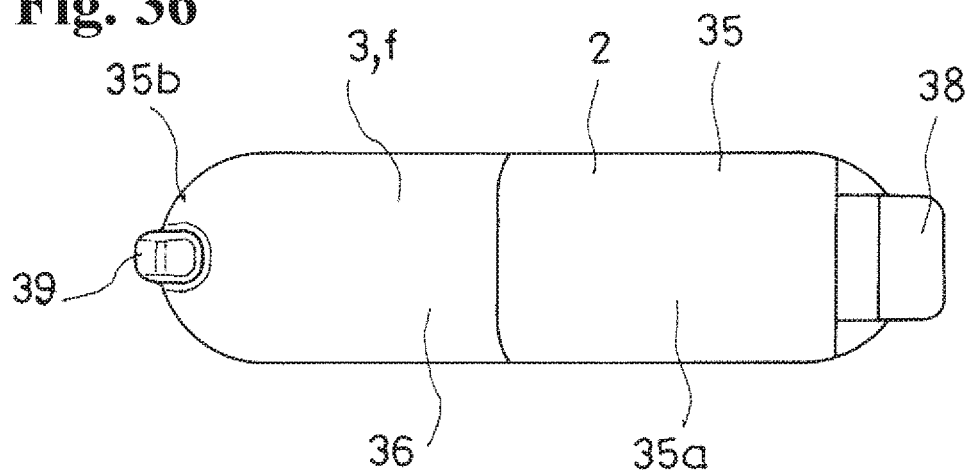
FIG. 36 is a rear view of the second member forming the fifth example.

In the cord lock of the fifth example, the first member 1 includes the bottom face portion 7 having the length and the width; side face portions 6d and 6d in the length direction positioned on the right and left sandwiching the virtual center line z; and side face portions 6e and 6e in the width direction at two portions, and has a structure wherein a side opposite to the bottom face portion 7 is open. The example shown in the drawings has a structure wherein a rising size of the side face portion 6e in the width direction positioned on the left side in FIG. 26 is larger than a rising size of the side face portion 6e in the width direction positioned on the right side, and a projecting size of the side face portion 6d in the length direction from the bottom face portion 7 is gradually reduced toward the right side from the left side in FIG. 26. In the example shown in the drawings, respectively on the left side and the right side in FIG. 26, the first member 1 further comprises a tongue piece portion 30 projecting outwardly from a base portion of the side face portion 6e in the width direction in such a way that one face thereof is positioned on the same face as an inner face 7c of the bottom face portion 7, and the other face thereof is positioned on the same face as the outer face 7b of the bottom face portion 7. In this example, using such tongue piece portion 30, the cord lock can be fixed to a use object of the cord lock by sewing, welding, and the like. The first passage portion 4 is formed in such a way as to pass through an inside and an outside of the side face portion 6e in the width direction positioned on the left side in FIG. 26. Incidentally, in the example shown in the drawing, a square through-hole 31 is formed in the bottom face portion 7 at a position directly under the first passage portion 4. On the other hand, the second passage portion 5 is formed in such a way as to pass through a position on the virtual center line z in the bottom face portion 7 on the right side in FIG. 26 (FIG. 29). A through-hole 32 larger than the second passage portion 5 is formed between the second passage portion 5 and the side face portion 6e in the width direction positioned on the right side in FIG. 26 (FIG. 29). The through-hole 32 and the second passage portion 5 are communicated by a communication hole 33 gradually reducing a hole width as moving near the second passage portion 5 side. Also, a projecting portion 34 projecting inwardly from an inner face of the side face portion 6e in the width direction is formed directly above the through-hole 32, and in the example, such projecting portion 34 functions as the engaged portion. Also, in the example, the support portion 29 is formed between a position of an approximately middle in the length direction of the first member 1 and the second passage portion 5. In the example, the support portion 29 is respectively provided on the right and left sandwiching the virtual center line z. The support portions 29 and 29 on the right and left respectively have a column shape wherein a lower end is integrated with the bottom face portion 7, and one portion of a side portion is integrated with an inner face of the side face portion 6d in the length direction, and a gap through which the cord R passes is formed between the support portions 29 and 29 on the right and left (see FIG. 32).

On the other hand, in the cord lock of the fifth example, the second member 2 comprises a base plate portion 35 having the length and the width; the third passage portion 21; an inside plate portion 36; and the engaging portion (for example, the later-described tongue piece 38). The base plate portion 35 has an outline shape which can be complementarily housed inside a space surrounded by four side face portions 6d ... 6e of the first member 1. One face 35a of the base plate portion 35 forms an outer face of the cord lock. The inside plate portion 36 is shorter than the base plate portion 35, and has a size which can be housed in the space inside the first member 1. The inside plate portion 36 and the base plate portion 35 are integrated in such a way as to open an interval passing the cord R through between the inside plate portion 36 and the base plate portion 35 through a connection portion 37 on the free end 20 side of the second member 2. The third passage portion 21 is formed such that the connection portion 37 passes through in a direction along the length direction of the second member 2. The engaging portion is formed by the tongue piece 38 projecting in such a way as to form a step 38a on one face side of the base plate portion 35 on the support point 19 side of the second member 2 of the base plate portion 35.

Although a distance from a free end 35b of the base plate portion 35 which becomes the free end 20 of the second member 2 to the step 38a is substantially equal to a distance between the side face portions 6e and 6e in the width direction of the two portions of the first member 1, a distance between the free end 20 and a tip of the tongue piece 38 is larger than that. In the example shown in the drawings, the tongue piece which becomes the engaging portion is housed below the projecting portion 34 which becomes the engaged portion, so that the first member 1 and the second member 2 are combined by a portion where the projecting portion 34 and the tongue piece 38 contact with each other as the support point 19. Also, in this combined state, a projecting end 36a side of the inside plate portion 36 abuts against the bottom face portion 7 of the first member 1 between the first passage portion 4 and the support portion 29. In the example shown in the drawings, in the free end 20 of the second member and below an entrance of the third passage portion 5, more specifically, in an entrance of the third passage portion 21 and a connection portion side between the connection portion 37 and the inside plate portion 36, there is formed a claw portion 39. Then, the combined state between the first member 1 and the second member 2 is maintained by catching the claw portion 39 on the inner face positioned at a projecting end side of the side face portion 6e in the width direction in the first passage portion 4 (FIG. 26). Specifically, from a state wherein the tongue piece 38 which becomes the engaging portion is housed below the projecting portion 34 which becomes the engaged portion, when the free end 20 side of the second member 2 is pushed into the space of the first member 1, the claw portion 39 abuts against a projecting end of the side face portion 6e in the width direction so as to cause the elastic deformation mainly on a first member 1 side, and to allow the pushing which allows the claw portion 39 to enter into the first passage portion 4, and by the elastic return after that, the claw portion 39 is caught on an inner face of the first passage portion 4. Then, in the combined state as mentioned above, the inside plate portion 36 causes the elastic deformation in a direction of narrowing a distance between the inside plate portion 36 and the base plate portion (FIG. 26). In that state, the first passage portion 4 and the third passage portion 21 do not match (FIG. 26). When the free end 20 of the second member 2 is operated to be pushed, a portion positioned on the free end 20 side more than the support portion 29 in the base plate portion 35 is elastically deformed such that the support portion 29 is a deformation center so as to generate a state wherein the first passage portion 4 and the third passage portion 21 match. In that matching state, the cord R can be inserted into the cord lock through the first passage portion 4, the second passage portion 5, and the third passage portion 21. After the cord R is inserted to pass through, when the push-in operation of the second member 2 is stopped, the base plate portion 35 and the inside plate portion 36 are elastically returned, and the second member 2 moves in a direction where the first passage portion 4 and the third passage portion 21 are mismatched, so that the cord lock is fastened to the cord R by an urging force of such elastic return.

Namely, in the cord lock of the fifth example, the urging device 3 as a separate member is not required as in the case of the cord lock of the first example to the fourth example. In the cord lock of the fifth example, the urging device 3 is formed by the inside plate portion 36 as the elastically deformable portion f which is one portion of the second member 2, extends to the support point 19 side from the third passage portion 21 side, forms the insertion passage for the cord R between the inside plate portion 36 and the base plate portion 35 of the second member 2, and abuts against the first member 1; and the base plate portion 35.

Incidentally, the urging device 3 can be formed only by the inside plate portion 36, and the base plate portion 35 can be formed without the elastically deformable portion f as well, and in that case, the support portion 29 becomes unnecessary.

Sixth Example

Figure 37:
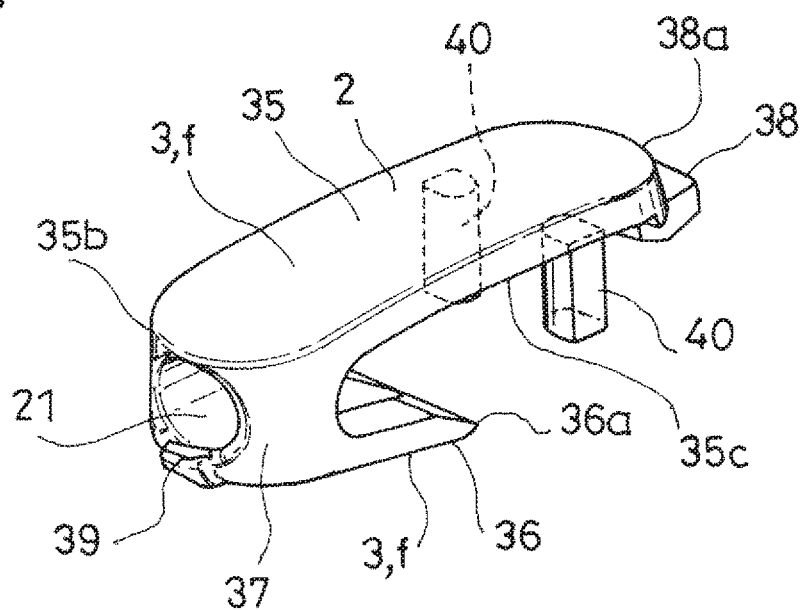
FIG. 37 is a perspective view of the second member forming the cord lock (a sixth example) according to one embodiment of the present invention.

In the cord lock of the sixth example shown in FIG. 37, the urging device 3 is formed by the elastically deformable portion f which is one portion of the second member 2, and provided between the third passage portion 21 and the support point 19. Also, the second member 2 comprises a support portion 40 causing the elastic deformation in the elastically deformable portion f by abutting against the first member 1. In the example shown in the drawing, the support portion 40 is formed on the other face 35c facing the bottom face portion 7 of the first member 1 in the base plate portion 35 of the second member 2; between the third passage portion 21 and the support point 19; and on the support point 19 side more than the inside plate portion 36. Such support portion 40 is provided respectively on the right and left sandwiching the virtual center line z. The support portions 40 and 40 on the right and left respectively have a column shape wherein an upper end is integrated with an inner face of the base plate portion 35, and a gap through which the cord passes is formed between the support portions 40 and 40 on the right and left.

Since the rest of a structure of the sixth example is substantially the same as that of the fifth example including the first example, the same symbols used in the first example are assigned to the drawing showing the fifth example as FIG. 37, and their explanations are omitted.

An elastic deformation characteristic can be easily provided to a portion which should comprise the aforementioned characteristic in the cord lock of each example explained in the above by making the first member 1 and the second member 2 as a plastic molded article.

Incidentally, obviously, the present invention is not limited to the embodiments explained hereinabove, and includes all embodiments which can obtain the object of the present invention.

EXPLANATION OF SYMBOLS

R a code
1 a first member
2 a second member
3 an urging device
4 a first passage portion
5 a second passage portion 19 a support point
20 a free end
21 a third passage portion Incidentally, all contents of the specifications, claims, drawings, and abstracts of Japanese Patent Applications No. 2015-008339 filed on Jan. 20, 2015 and 2015-238159 filed on Dec. 7, 2015 are cited in their entireties herein and are incorporated as a disclosure of the specification of the present invention.

What is claimed is:

1. A cord lock, comprising:
a first member including a first passage portion and a second passage portion for a cord;
a second member combined with the first member so as to be capable of moving to rise and fall at a support point on a second passage portion side of the first member, and including a third passage portion for passing the cord therethrough, positioned between the first passage portion and the second passage portion and arranged on a free end side of the second member opposite to the support point to be capable of a rising and falling movement thereof; and
an urging device urging the second member in a standing direction,
wherein the support point is formed by an engaging portion formed in one of the first member and the second member, and an engaged portion formed in the other of the first and second members, and engaged with the engaging portion, and the cord pulled out of the second passage portion is positioned on the free end side of the second member more than the support point, and
the engaging portion is formed by an engagement claw, and the engaged portion is formed by an engagement hole with which the engagement claw is engaged.

2. A cord lock, comprising:
a first member including a first passage portion and a second passage portion for a cord;
a second member combined with the first member so as to be capable of moving to rise and fall at a support point on a second passage portion side of the first member, and including a third passage portion for passing the cord therethrough, positioned between the first passage portion and the second passage portion and arranged on a free end side of the second member opposite to the support point to be capable of a rising and falling movement thereof; and
an urging device urging the second member in a standing direction,
wherein the first member includes a side face portion and a bottom face portion, and supports the second member so as to be capable of moving to rise and fall inside the side face portion and the bottom face portion,
the second passage member is formed across the side face portion and the bottom face portion, and
a concave portion housing the free end side of the second member so as not to form a step between the third passage portion and the bottom face portion is provided on the bottom face portion of the first member in a state wherein the second member is operated to be pushed in against urging of the urging device.

3. A cord lock, comprising:
a first member including a first passage portion and a second passage portion for a cord;
a second member combined with the first member so as to be capable of moving to rise and fall at a support point on a second passage portion side of the first member, and including a third passage portion for passing the cord through, positioned between the first passage portion and the second passage portion and arranged on a free end side of the second member opposite to the support point to be capable of a rising and falling movement thereof;
a guide wall for guiding the cord inserted from one of the first passage portion and the second passage portion to the other of the first passage portion and the second passage portion; and
an urging device urging the second member in a standing direction,
wherein the support point is formed by an engaging portion formed in one of the first member and the second member, and an engaged portion formed in the other of the first and second members, and engaged with the engaging portion,
the first member includes a side face portion and a bottom face portion, and supports the second member so as to be capable of moving to rise and fall inside the side face portion and the bottom face portion,
one of the engaging portion and the engaged portion is provided on a bottom face portion side of the first member, and
the guide wall is formed by a first guide wall formed inside the first member; and a second guide wall formed inside the second member and forming one portion of an insertion passage for the cord together with the first guide wall in a state wherein the second member is fallen against urging of the urging device.

4. A cord lock according to claim 1, wherein a bottom face portion of the first member is bent or curved in such a way that a support point side becomes an inside of bending or curving.

5. A cord lock according to claim 1, wherein the urging device is formed by an elastically deformable portion which is one portion of the second member, and provided between the third passage portion and the support point, and
the first member includes a support portion abutting against the elastically deformable portion, and causing an elastic deformation in the elastically deformable portion.

6. A cord lock according to claim 1, wherein the urging device is formed by an elastically deformable portion which is one portion of the second member, and provided between the third passage portion and the support point, and
the second member includes a support portion abutting against the first member, and causing an elastic deformation in the elastically deformable portion.

7. A cord lock according to claim 1, wherein the urging device is formed by an elastically deformable portion which is one portion of the second member, extends to a support point side from a third passage portion side, forms an insertion passage for the cord between the elastically deformable portion and a base plate portion of the second member, and abuts against the first member.

* * * * *